(12) United States Patent
Yoon

(10) Patent No.: US 10,467,981 B1
(45) Date of Patent: Nov. 5, 2019

(54) METHOD AND APPARATUS FOR PROVIDING INTERFACE BETWEEN DEDICATED DISCRETE GRAPHICS PROCESSING UNIT AND HEAD MOUNTED DISPLAY USING TYPE-C UNIVERSAL STANDARD BUS

(71) Applicant: Dell Products, LP, Round Rock, TX (US)

(72) Inventor: Myungkee Yoon, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/007,909

(22) Filed: Jun. 13, 2018

(51) Int. Cl.
*G06T 1/20* (2006.01)
*G09G 5/00* (2006.01)
*G06F 13/42* (2006.01)

(52) U.S. Cl.
CPC ......... *G09G 5/006* (2013.01); *G06F 13/4282* (2013.01); *G06T 1/20* (2013.01); *G06F 2213/0042* (2013.01); *G09G 2340/0407* (2013.01); *G09G 2370/00* (2013.01)

(58) Field of Classification Search
CPC .............................. G06T 1/20; G06F 13/4282
USPC .......................................................... 345/520
See application file for complete search history.

(56) References Cited

U.S. PATENT DOCUMENTS

| | | |
|---|---|---|
| 9,363,569 B1 | 6/2016 | van Hoff |
| 2014/0161412 A1 | 6/2014 | Chase |
| 2015/0212647 A1 | 7/2015 | Kim |
| 2016/0267712 A1 | 9/2016 | Nartker |
| 2016/0370835 A1 | 12/2016 | Erickson |
| 2017/0017595 A1 | 1/2017 | Schnell |
| 2017/0153672 A1 | 6/2017 | Shin |
| 2018/0068412 A1* | 3/2018 | Schnell ..................... G06T 1/20 |

(Continued)

*Primary Examiner* — Thomas J Lett
(74) *Attorney, Agent, or Firm* — Prol Intellectual Property Law, PLLC; H. Kenneth Prol

(57) ABSTRACT

An information handling system with a hybrid Universal Serial Bus Type-C (USB-C) port architecture and method for operating the same comprising a USB-C port for communicating display graphics signals to a plurality of peripheral device types attachable to the USB-C port where the USB-C port is operably connected to a high throughput data translation hub via a first data bus capable of transmitting the display graphics signal at least at 8.1 Gbit/s across at least four lanes and the high throughput data translation hub is operably connected to a dedicated discrete graphics processing unit (dGPU) and operably connected to a CPU with integrated GPU (iGPU) operating with lower graphics processing capacity and power than the dGPU. A USB-C controller executing code instructions of the hybrid USB-C head mounted display interface management system to instruct the USB-C port to operate in a first mode or in a second mode depending on identification of a peripheral device type attached to the USB-C port where the USB-C port is operably connected to a first multiplexing circuit via a second data bus for transmitting USB data wherein the first multiplexing circuit is capable of operating in the first mode to operably connect USB data from the USB-C port to the USB-C controller, and the first multiplexing circuit is capable of operating in the second mode to operably connect the dGPU to the USB-C port via a USB data line parallel to the first data bus.

20 Claims, 5 Drawing Sheets

(56) References Cited

U.S. PATENT DOCUMENTS

| | | | |
|---|---|---|---|
| 2018/0081843 A1* | 3/2018 | Kadgi | G06F 9/4411 |
| 2018/0205237 A1* | 7/2018 | Kuo | H02J 7/0054 |
| 2019/0121764 A1* | 4/2019 | Regupathy | G06F 13/362 |

* cited by examiner

METHOD AND APPARATUS FOR PROVIDING INTERFACE BETWEEN DEDICATED DISCRETE GRAPHICS PROCESSING UNIT AND HEAD MOUNTED DISPLAY USING TYPE-C UNIVERSAL STANDARD BUS

FIELD OF THE DISCLOSURE

The present disclosure generally relates to head mounted displays for information handling systems. The present disclosure more specifically relates to providing a Type-C Universal Standard Bus (USB-C) interface for transmitting graphics images between a head mounted display headset and a dedicated discrete graphics processing unit (dGPU).

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a dedicated discrete graphics processing unit (dGPU) and/or a head mounted display headset.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
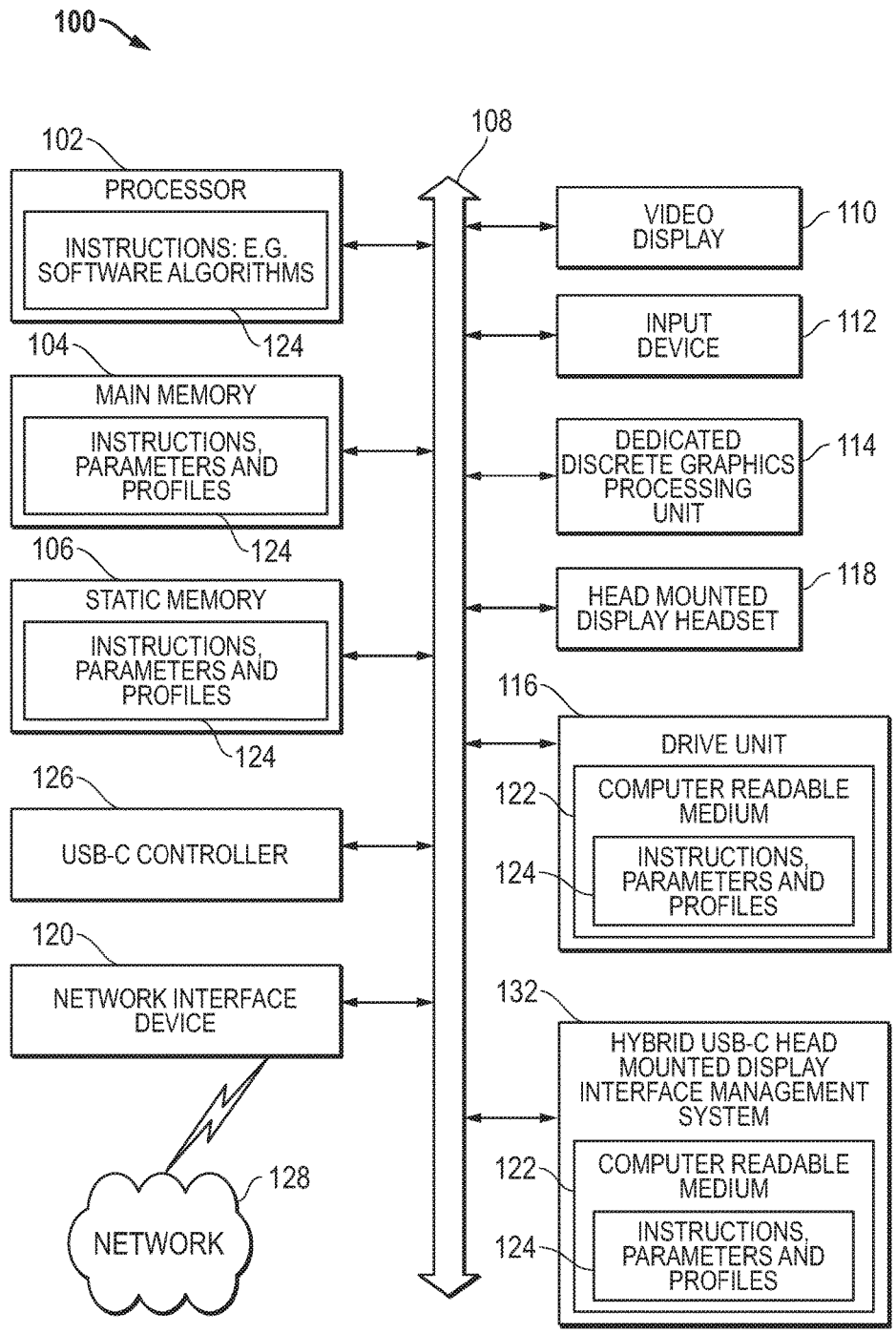
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display headsets, wearable around the user's head and/or eyes and including head mounted displays having the capability of reflecting projected images may be used with augmented or virtual reality display systems. In such systems, the head mounted display may receive digital images generated at a discrete, dedicated graphics processing unit (dGPU), and may display those images within the wearable headset. The dGPU in embodiments described herein may be located within a host computer. In embodiments of the present disclosure, such a head mounted display headset may communicate with the dGPU within the host computer via one or more wired connections coupled to an interface on the host computing device. A host computing device may include, any information handling system displaying images and data as described herein. For example, a host computing device in an embodiment could be a laptop computer, or a tablet computer. As another example, a host computing device in another embodiment could be a personal desktop computer or a mobile phone. In order to communicate data between the dGPU and the head mounted display headset or video display most effectively, a solution involving limited architecture adjustments is needed to allow the head mounted display headset to interface with the dGPU of the host computing device using a single bus capable of transmitting data at the highest possible data rate.

Previous solutions required a head mounted display headset to interface with a host computer using at least two buses, including a Universal Standard Bus (USB) for the delivery of power and code instructions to the Head mounted display headset and either a DisplayPort or High Definition Multimedia Interface (HDMI) bus. Since such a previous system has been implemented, a new Type-C Universal Standard Bus (USB-C) has been developed by the Universal Serial Bus Implementers Forum (USB-IF). This new USB-C standard allows for the transfer of data that was previously transmitted across two or more buses within a single USB-C wire. For example, the new USB-C data bus may combine the capabilities of both the previously used USB wire and the previously used DisplayPort or HDMI wire into a single wire.

Previous solutions also employed a dGPU operating according to the DisplayPort standard version 1.2a set by the Video Electronic Standard Association (VESA), in which the dGPU could transmit data at a bandwidth of 5.4 Gbit/s per lane, resulting in a total bandwidth across four lanes of 21.6 Gbit/s. This 21.6 Gbit/s bandwidth in previous solutions was high enough to support display via the head mounted display headset of images generated at the dGPU at a resolution of 3840×2160 pixels (4K Ultra-High Definition) and a refresh rate of 60 Hz. Embodiments of the present disclosure may include a dGPU operating according to the more recent DisplayPort standard standards such as versions 1.4 or 1.3, also developed by VESA, in which the dGPU could transmit data at a bandwidth of 8.1 Gbit/s per lane, resulting in a total bandwidth across four lanes of 32.4 Gbit/s. This increased bandwidth is high enough to support display via the head mounted display headset at the 4K resolution with a much higher refresh rate of up to 120 Hz. This increase in bandwidth may also support display at the greater resolution of 5120×2880 (5K UHD) with a refresh rate of 60 Hz, and the much greater resolution of 7680×4320 pixels (8K UHD) with a refresh rate of 30 Hz. Thus, the dGPU in embodiments of the current disclosure generate much higher quality images.

Embodiments of the present disclosure provide a USB-C interface for connecting the host computing device with the head mounted display with limited modification to internal components to the host computing device that employed the previous solutions. For example, in previous solutions, the host computing device may have included a USB-C port, but such a port was not configured to provide an interface between the dGPU of the host computing device and the head mounted display headset. Rather, the head mounted display headset interfaced with the dGPU via an HDMI port or a miniDisplayPort. In such previous solutions, the dGPU could communicate with the USB-C port by sending transmissions first through an integrated graphics processing unit (iGPU), to a Thunderbolt® port, then to the USB-C port. However, this architecture of the previous solutions would negate the increased bandwidth capabilities of the dGPU of embodiments described herein operating according to the DisplayPort standard. The iGPU in embodiments of the present disclosure receives data directly from the dGPU via a plurality of peripheral component interconnect express graphics (PEG) data buses. The PEG data buses connecting the iGPU and the dGPU do not have bandwidth capabilities high enough to support the display of 5K or 8K resolution images, and can only support the display of 4K resolution images at a refresh rate of 60 Hz. When multiple buses are connected in series between two components, the highest total bandwidth between these two components is limited to the maximum bandwidth of the bus having the lowest bandwidth. As such, routing graphics display data generated at the dGPU to the USB-C port via the iGPU may automatically decrease the quality of the display images.

One potential solution to this issue includes adding a second USB-C port to the information handling system architecture, and directly connecting the dGPU to this second USB-C port via a DisplayPort data bus compliant with the DisplayPort standard. Although this solution may allow for transmission of high quality display information to the second USB-C port, addition of the second USB-C port is a substantial modification to the information handling system architecture. Further, it may be difficult for a user of the head mounted display headset to determine which of the two USB-C ports the head mounted display headset should interface with. A solution that does not require addition of a second USB-C port is needed.

A hybrid USB-C head mounted display interface management system in embodiments of the present disclosure addresses this issue by bypassing the iGPU to place the dGPU and the USB-C in more direct contact, and by toggling the USB-C port such that it can receive information via USB or DisplayPort data buses, depending on the type of data incoming to the USB-C port. In embodiments described herein, the dGPU may be operably connected to the Thunderbolt® port via a DisplayPort data bus compliant with the DisplayPort standard, such that the high quality images described above may be transmitted directly to the Thunderbolt® port. The Thunderbolt® port may then be operably connected to the USB-C port. The data bus between the Thunderbolt® port and the USB-C port in embodiments of the present disclosure may operate according to separate standards, based on the mode in which the USB-C port is set to operate. For example, the USB-C port may operate according to a default mode, in which the data bus connecting the Thunderbolt® port and the USB-C port transmits data according to the USB 3.0 or 3.1 specification which may have a lower bandwidth than the DisplayPort specification. As another example, the USB-C port may operate according to an alternate mode, in which the data bus connecting the Thunderbolt® port and the USB-C port transmits data according to the DisplayPort specification, capable of the higher bandwidths described above. By setting the USB-C port to operate according to the alternate mode in embodiments described herein, the dGPU may effectively transmit the high quality images associated with the DisplayPort 1.4, DisplayPort or other DisplayPort specification to the USB-C port.

At Thunderbolt® port or other high throughput data translation hub may be used in various embodiments herein. With respect to several of the currently described embodiments, a Thunderbolt® port is used in connection with the example hybrid Universal Serial Bus Type-C (USB-C) port architectures options described herein. One of skill in the art will understand that other high throughput data translation hubs may be used that may not be specifically a Thunderbolt® port as inherent in various Intel® architectures chip.

Embodiments of the present disclosure may also include a USB-C controller operably connected to the Thunderbolt® port, capable of determining when the Thunderbolt® port will be receiving data from the dGPU via a DisplayPort data bus such as when it is connected to a Head Mounted Display (HMD) headset. The USB-C controller may also be operably connected to the USB-C port and/or the CPU via a USB 2.0 or 3.0 data bus via operation of a multiplexer circuit enabling a range of operation via the USB-C port in coordination with the Thunderbolt® port or other high throughput data translation hub. The USB-C data port in embodiments described herein may initially operate in the default mode to send and receive data via one or more USB 2.0 or 3.0 data buses. If the USB-C controller detects the Thunderbolt® port or other high throughput data translation hub will be receiving data from the dGPU pursuant to detecting connection of an HMD headset or other display device requiring increased graphics processing in embodiments described herein, the USB-C controller may operate according to instructions received from the hybrid USB-C head mounted display interface management system to place the USB-C port in the alternate mode. Placing the USB-C controller in such an alternate mode in embodiments described herein may cause a plurality of pin connectors within the USB-C port to move away from their default modes in which they receive data according to the USB 3.0 or 3.1 specification to an alternate mode in which they receive data according to the DisplayPort specification. Operating in alternate mode may also cause a plurality of pin connectors within the USB-C port to transmit data at the higher bandwidth associated with the DisplayPort version 1.4 or 1.3 specifications to a peripheral device interfacing with those pin connectors via a USB-C cord. Moreover, the multiplexer circuit may allow for flow of USB data to be diverted to the dGPU for sensor information of operation of the HMD headset such as camera or positional data.

The USB-C controller in embodiments described herein may execute code instructions of the hybrid USB-C head mounted display management system to toggle the USB-C port between the default mode and the alternate mode as well as control operation of the multiplexer circuit in coordination of the type of device detected at the USB-C port. If the USB-C controller in embodiments detects an HMD headset device connected to the USB-C port for example and receiving information from the dGPU, CPU, iGPU, or head mounted display headset via a USB 2.0 or 3.0 data bus after the USB-C port has been placed in the alternate mode, then the USB C controller will provide for substantial connectivity to a dGPU. The USB-C controller may also place the USB-C port back into the default mode to receive the data incoming via the USB 2.0 or 3.0 data bus and via a multiplexer circuit. The ability of the USB-C port to toggle between these modes in embodiments negates the need for a second USB-C port. In such a way, the hybrid USB-C head mounted display interface management system in embodiments of the present disclosure may allow for transmission of higher quality graphical image data to a head mounted display headset than previous solutions via a single wire, with limited modification to the architecture of host computing devices of the previous solutions.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU) 114, hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the hybrid USB-C head mounted display interface management system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a host video display 110. The host video display 110 in an embodiment may function as a liquid crystal display (LCD), an organic light emitting diode (OLED), a flat panel display, a solid state display, or a cathode ray tube (CRT). Additionally, the information handling system 100 may include an input device 112, such as a keyboard, and/or a cursor control device, such as a mouse, touchpad, or gesture or touch screen input. The information handling system 100 may also include a head mounted display headset 118, which may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display headset 118 may use any method that reflects projected images in order to create an augmented reality. In some embodiments, the information handling system 100 does not include the head mounted display headset 118. In other aspects the head mounted display headset 118 may include various levels of processing capability via a processor or controller, and various levels of memory to assist in head mounted image display in some embodiments. The information handling system 100 can also include a disk drive unit 116.

The information handling system 100 may also include a GPU 114. The GPU 114 in an embodiment may be a dedicated discrete graphics processing unit 114. A dedicated discrete graphics processing unit 114 in an embodiment may operate using RAM not available for use by the remaining components of the information handling system 100, including the CPU 102. In contrast, an integrated graphics process unit (not shown) may operate using the same RAM used by all components within the information handling system 100. The dedicated discrete graphics processing unit 114 in an embodiment may be capable of transmitting data conforming to the DisplayPort specification, whereby data may be transferred at a rate of 8.1 Gbit/s across each of four lanes of a data line, resulting in a total bandwidth of 32.4 Gbit/s per data line. A USB-C controller 126 within an information handling system in an embodiment may operate to instruct a USB-C port operably connected to the dedicated discrete graphics processing unit 114 to operate in a mode that allows the USB-C port to receive data conforming to the Display-Port specification.

The information handling system 100 may also include a hybrid USB-C head mounted display interface management system 132 that may be operably connected to the bus 108. The hybrid USB-C head mounted display interface management system 132 computer readable medium 122 may also contain space for data storage. The hybrid USB-C head mounted display interface management system 132 may perform tasks related to providing an interface whereby the head mounted display 118 may receive and/or transmit display graphics data to or from the GPU 114 via a bus compliant with the DisplayPort standard.

In an embodiment, the hybrid USB-C head mounted display interface management system 132 may communicate with the main memory 104, the processor 102, the host video display 110, the alpha-numeric input device 112, host video display 110, graphics processing unit 114, head mounted display 118, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards. For example, the head mounted display headset may be wired in some circumstances or may be connected via wireless connectivity in other embodiments to a base information handling system.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. It is understood that other devices such as peripheral devices may be connected via wireless or wired connectivity as well according to various protocols described herein.

The information handling system 100 can include a set of instructions 124 that can be executed to cause the computer system to perform any one or more of the methods or computer based functions disclosed herein. For example, instructions 124 may execute a hybrid USB-C head mounted display interface management system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Win32s, Win64, WinCE, Core Java API, or Android APIs.

The disk drive unit 116 and the hybrid USB-C head mounted display interface management system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the hybrid USB-C head mounted display interface management system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the hybrid USB-C head mounted display interface management system 132 may be executed locally or remotely. The main memory 104 and the processor 102 also may include computer-readable media.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium, such as NOR or NAND flash memory in some example embodiments. The hybrid USB-C head mounted display interface management system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
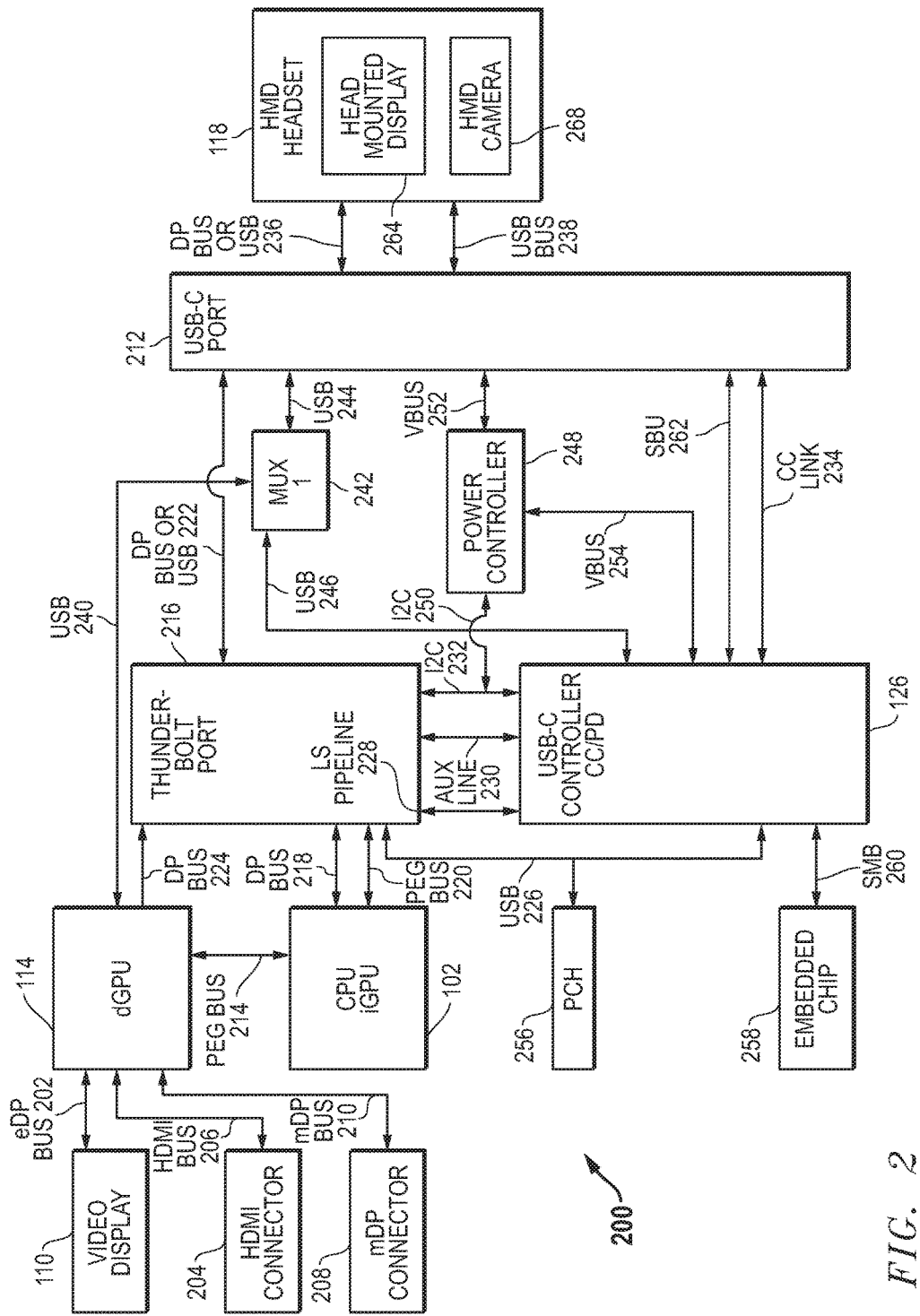
FIG. 2 is a block diagram of a hybrid Universal Serial Bus Type-C (USB-C) port architecture for interface with a head mounted display headset according to a first embodiment of the present disclosure.

FIG. 2 is a block diagram of a hybrid USB-C port architecture for DisplayPort interface with a head mounted display headset according to a first embodiment of the present disclosure. The hybrid architecture 200 allows for the dedicated discrete graphics processing unit (dGPU) 114 to operably connect to the USB-C port 212 via one or more buses conforming to the DisplayPort specification set by the Video Electronics Standards Association. Version 1.3 of the DisplayPort specification allows for the transmission of display graphics signals via four lanes per data line, at a rate of 8.1 Gbit/s per lane, giving a total bandwidth of 32.4 Gbit/s per data line. For example, the embedded DisplayPort (eDP) bus 202 operably connecting the dGPU 114 with the video display 110 may conform to the DisplayPort specification. Display graphics transmitted via a bus conforming to Version 1.3 of the DisplayPort specification may be of a higher quality than display graphics transmitted via buses conforming to the earlier version 1.2 of the DisplayPort specification, High Definition Multimedia Interface (HDMI) specification, or Peripheral Component Interface Express Graphics (PEG) specification.

Previous architectures operably connected the dGPU 114 to the head mounted display headset 118 via one or more of these lower quality buses. For example, in previous architectures, the head mounted display headset 118 could operably connect to the dGPU 114 via the HDMI connector 204 and HDMI bus 206, or via the miniDisplayPort (mDP) connector 208 and mDP bus 210. The miniDisplayPort bus in such architectures was capable of transmitting data only in accordance with the DisplayPort 1.2 specification, and could not achieve the bandwidth associated with the DisplayPort specification. Similarly, the HDMI bus could not achieve the bandwidth associated with the DisplayPort specification. However, even as the miniDisplayPort, HDMI, or other bus architectures provide higher bandwidth and speeds, several additional connector ports may be required on an information handling system occupying space on or in the chassis that may be undesirable. In an aspect of the present disclosure, a USB-C port 212 is described which is capable of supporting an HMD headset 118 and high bandwidth data for a head mounted display such as 264. Previous architecture allowed for the direct connection between the head mounted display headset 118 and the dGPU 114 via buses less capable of achieving the bandwidth required for transmission of the high-quality graphics achieved in embodiments herein or requiring additional ports on an information handling system.

The head mounted display headset 118 in previous architectures could connect to the dGPU 114 less directly via the USB-C port 212. In such previous architectures, the dGPU 114 was not directly connected to the Thunderbolt® port 216 or the USB-C port 212. Rather, display graphics data transmitted between the dGPU 114 and the USB-C port 212 were routed through the integrated graphics processing unit (iGPU) 102, which was directly connected to the Thunderbolt® port 216. The iGPU 102 in such previous architectures and in embodiments of the present disclosure is capable of interfacing with buses 214 and 220 conforming to the PEG standard and bus 218 conforming to the DisplayPort 1.2 standard, but not buses conforming to the DisplayPort standard. For example, the iGPU 102 in previous architectures was operably connected to the dGPU 114 via a PEG bus 214 and to the Thunderbolt® port 216 via the DisplayPort 1.2 bus 218 and via the PEG bus 220. In order to transmit display graphics data between the dGPU 114 and the USB-C port 212 in such previous architectures, the display graphics data would be forced through a bus having a lower bandwidth than that allowed by the DisplayPort standard (e.g. PEG or DisplayPort 1.2). Because the total bandwidth of transmission between the dGPU 114 and the USB-C port 212 in an embodiment is limited by the bus having the lowest bandwidth between the dGPU 114 and the USB-C port 212, previous architectures did not allow for the transmission of display graphics signals between the dGPU 114 and USB-C port 212 sufficient to create the higher quality display graphics associated with the DisplayPort standard.

Embodiments of the present disclosure address this issue by more directly connecting the dGPU 114 to the USB-C port 212. Further, routing through an iGPU is eliminated. For example, the dGPU 114 in an embodiment may be operably connected to the Thunderbolt® port 216 via DisplayPort bus 224. As described above, the Thunderbolt® port 216 is a type of high throughput data translation hub and may be replaced by another type of high throughput data translation hub in other embodiments of the presently described hybrid USB-C port architecture shown in FIG. 2. Hereinafter it shall be understood that reference to the Thunderbolt® port such as 216 may similarly refer to another type of high throughput data translation hub in variations of the embodiments described herein. The Thunderbolt® port 216 in such an embodiment may then operably connect to the USB-C port 212 via the DisplayPort bus 222. In such a way, each of the buses operably connecting the dGPU 114 to the USB-C port 112 in an embodiment may be capable of transmitting display graphics data at the higher bandwidth allowed by the DisplayPort specification.

The USB-C port 212 in an embodiment may be capable of operating according to multiple modes. For example, the USB-C port 212 in an embodiment may include several pin connectors capable of receiving different types of data depending on the state in which they are placed. Two pairs of pin connectors of the USB-C port 212 in an embodiment may operate according to a default mode to receive USB 3.0 or USB 3.1 data, which is associated with a lower bandwidth than DisplayPort data. Similarly, two pairs of pin connectors of the USB-C port 212 in an embodiment may operate according to the default mode to transmit USB 3.0 or USB 3.1 data. However, each of these four total pairs of pin connectors of the USB-C port 212 may also operate according to an alternate mode to either transmit or receive data conforming to the higher bandwidth DisplayPort specification.

A USB-C controller 126 in an embodiment may operate to execute machine-readable code instructions of the hybrid USB-C head mounted display interface management system to instruct the USB-C port 212 to operate according to either the default mode or the alternate mode. The USB-C port 212 in an embodiment may initially operate according to a default mode in which one or more toggle capable pairs of pins may operate to transmit data via a USB 2.0 or 3.0 data bus. Moreover, multiplexer circuit 242 may operate via USB 246 for regular USB 2.0 or 3.0 data. In an example embodiment, the USB-C controller 126 may execute code instructions of the hybrid USB-C head mounted display interface management system to instruct the USB-C port 212 to switch to an alternate mode when it is determined a device, such as head mounted display (HMD) headset 118 is connected and display graphics data is being transmitted between the dGPU 114 and the HMD headset 118. When operating in the alternate mode, one or more of the toggle-capable pairs of pins within the USB-C port 212 in an embodiment may operate to transmit data via a DisplayPort bus. Moreover, multiplexer circuit 242 may provide for a USB connection via USB 240 and USB 244 to USB-C port 212 and USB bus 238. Two separate scenarios may indicate display graphics data is being transmitted between the dGPU 114 and the head mounted display headset 118 in an embodiment. For example, detecting operable connection of the head mounted display headset 118 to the USB-C port 212 via a USB-C link capable of transmitting and receiving data according to the DisplayPort specification may indicate the transfer of display graphics data between the dGPU 114 and the head mounted display headset 118 may be occurring. As another example, the Thunderbolt® port 216 receiving display graphics data from the dGPU 114 via DisplayPort bus 224 may indicate the transfer of display graphics data between the dGPU 114 and the head mounted display headset 118 may be occurring.

The USB-C controller 126 in such an embodiment may be capable of detecting when either of these scenarios are occurring. For example, the USB-C controller 126 in an embodiment may be operably connected to the USB-C port 212 via the data bus conforming to standards set by the USB-C standard for Configuration Channel (CC link) 234 and via the data bus conforming to Sideband Use busses (SBU) 262 such as SBU1 and SBU 2 under USB-C. The USB-C port 212 in an embodiment may operate to detect when the head mounted display headset has connected to the USB-C port 212 via a USB-C line capable of receiving display graphics data according to the DisplayPort specification, and transmitting notification of such a connection to the USB-C controller 126 via either the SBU 262 or the CC link 234. As another example, the USB-C controller 126 in an embodiment may be operably connected to the Thunderbolt® port 216 via a USB 226 (e.g. USB 2.0 or USB 3.0), via an LS pipeline 228, via an auxiliary line 230, and/or via an I2C line 232. The USB-C controller 126 in an embodiment may receive an indication via one or more of these lines that DisplayPort specification bus 224 is being used to transfer display graphics data between the dGPU 114 and the Thunderbolt® port 216. Receipt of an indication that either of these scenarios are occurring may prompt the USB-C controller 126 in an embodiment to execute code instructions of the hybrid USB-C head mounted display interface management system to place the USB-C port 212 in an alternate mode in which it may dedicate one or more pairs of ports to the receipt and/or transmission of display graphics data conforming to the DisplayPort standard as well as providing USB connectivity via USB 240 to dGPU 114 for sensors and cameras on the HMD headset 118.

The USB-C controller 126 in an embodiment may be operably connected to the USB-C port 212 via one or more buses. For example, CC link 234 and/or Side-Band Use (SBU) bus 262 operating under the USB-C standard may operably connect the USB-C controller 126 and the USB-C port 212 in an embodiment. Upon determining the USB-C port 212 should be operating according to the alternate mode in an embodiment, the USB-C controller 126 may execute code instructions of the hybrid USB-C head mounted display interface management system to transmit a command instruction to the USB-C port 212 via CC link 234 to instruct the USB-C port 212 to operate according to the alternate mode. In response to such a command, the USB-C port 212 in an embodiment may set one or more pairs of toggle-capable pin connectors operably connected with bus 222 to receive data according to the DisplayPort standard. The USB-C port 212 in an embodiment may further set another one or more pairs of toggle-capable pin connectors operably connected to bus 236 to transmit data according to the DisplayPort standard. In another aspect of such an embodiment, the USB-C port 212 may respond to such an instruction by setting the one or more pairs of toggle-capable pin connectors operably connected with bus 236 to receive data according to the DisplayPort standard and set the one or more pairs of toggle-capable pin connectors operably connected with bus 222 to transmit data according to the DisplayPort standard. By setting the one or more pairs of pin connectors of the USB-C port 212 to operate in such a way, the bus 222 and the bus 236 effectively become DisplayPort buses capable of transmitting and receiving data at 1.8 Gbit/s across four lanes for each data line.

As described herein, the dGPU 114 may be directly connected to the Thunderbolt® port 216 or other high throughput data translation hub via a DisplayPort specification bus 224, and the Thunderbolt® port 216 or similar high throughput data translation hub may be operably connected to the USB-C port 212 via bus 222. Bus 236 may operably connect the USB-C port 212 to the head mounted display headset 118 in an embodiment. When buses 222 and 236 operate according to the DisplayPort specification, as described directly above, the head mounted display headset 118 becomes operably connected to the dGPU 114 via a series of buses, all operating according to the DisplayPort specification. In such a way, the dGPU 114 may transmit display graphics data to the head mounted display headset 118 at a bandwidth of 1.8 Gbit/s across each of four lanes per data line. This bandwidth is high enough to support display via the head mounted display headset at the 4K resolution with a refresh rate of up to 120 Hz. This bandwidth may also support display at a resolution of 5120×2880 (5K UHD) with a refresh rate of 60 Hz, and a resolution of 7680×4320 pixels (8K UHD) with a refresh rate of 30 Hz. In contrast, previous architectures provided a maximum bandwidth of 5.4 Gbit/s across four lanes, which was high enough to support the 4K resolution at a lower refresh rate of 60 Hz, and could not support 5K or 8K resolution at all. Thus, the dGPU in embodiments of the current disclosure can transmit much higher quality images to the head mounted display headset 118, and/or receive much higher quality images from the head mounted display headset 118. Further, coordination of HMD camera 268 data or other sensor data may be made by the dGPU 114 via a USB 240 connection and USB bus 238. As described below, multiplexing circuit (MUX 1) 242 may provide for a USB connection via USB 240 and 244 to USB-C port 212 which may connect via USB 238. Thus, coordination of operation head mounted display 264 with the 4K display data and the sensor data such as HMD camera 268 may occur.

According to the Thunderbolt® port standard, a limited amount of high bandwidth lines are available on a chip side of the Thunderbolt® port 216. As such, in an embodiment described with reference to FIG. 2, DisplayPort bus 224 having two data lines with four lanes each (for a total of eight lanes) may operably connect the dGPU 114 to the chip side of the Thunderbolt® port 216, while DisplayPort 1.2 bus 218 having one data line with four lanes may operably connect the CPU/iGPU 102 to the chip side of the Thunderbolt® port 216 In other words, the Thunderbolt® port 216 may operably connect to other components on its chip side via three high bandwidth data lines having four lanes each, for a total of twelve high bandwidth lanes. By dedicating eight of these twelve high bandwidth lanes (e.g. DisplayPort bus 224) to connecting the dGPU 114 to the USB-C port 212, and only four of these lanes (e.g. DisplayPort 1.2 bus 218) to connecting the CPU/iGPU 102 to the USB-C port 212, may reduce the number of high bandwidth lanes connecting the CPU/iGPU 102 to the USB-C port 212 in comparison to previous solutions. This tradeoff may be worthwhile, however because it allows for transmission of higher-quality graphics information from the dGPU 114 to the HMD headset 118 and/or to other peripheral displays in an embodiment.

The USB-C port 212 in an embodiment may further connect to the head mounted display headset 118 via bus 238, which may operate at all times according to either the USB 2.0 or USB 3.0 standard. In other embodiments, bus 238 may operate according to any current or future implementation of the USB standard, including USB 3.1 and USB 3.2. Connection of the head mounted display headset 118 to the USB-C port 212 via the USB bus 238 in an embodiment may allow for transmission of information from the head mounted display headset 118 to the dGPU 114. For example, camera data from HMD camera 268 may be transmitted via USB 238, multiplexer circuit 242, and USB 240 to dGPU 114. Camera data or other sensor data of the HMD headset 118 may be used in coordination of transmitted display data via the DisplayPort bus 236 for the headmounted display 264. For example, the HMD headset 118 may transmit positional information of the HMD headset 118 or camera data to the dGPU 114 via USB 238, such that the dGPU 114 can effectively synchronize images it renders with the perspective from the image should be viewed from within the HMD headset 118. USB-C port 212 in an embodiment may operate to receive and transmit data via bus 236 through one or more pin connectors while simultaneously receiving or transmitting data via bus 238 through a separate one or more pin connectors. Thus, when operating in an alternate mode, the USB-C port 212 may be capable of transmitting and receiving data to or from the head mounted display headset 118 via both a DisplayPort specification compliant bus and a USB compliant bus (e.g. USB 2.0 or USB 3.0). In other aspects, when operating in an alternate mode, the USB-C port 212 may be capable of transmitting and receiving data to or from the head mounted display headset 118 via a DisplayPort specification compliant bus and receiving power from a power controller 248 via USB 238, using a single USB-C cord connecting the head mounted display headset 118 and the USB-C port 212.

In an embodiment, the dGPU 114 may be operably connected to a multiplexing circuit (MUX 1) 242 via a USB 240 which may also be connected to USB-C port 212 via USB 244. The multiplexing circuit 242 may also be operably connected to the USB-C controller 126 via USB 246 and to the USB-C port 212 via USB 244. In an embodiment, the multiplexing circuit 242 may operate according to two separate states. In a first state, the multiplexing circuit 242 may operably connect the dGPU 114 to the USB-C port via USB 240 and USB 244. In a second state, the multiplexing circuit 242 may sever the connection between the USB-C port 212 and the dGPU 114. As described herein, the dGPU 114 may transmit high-quality display graphics information to the HMD headset 118 via a DisplayPort bus, but may also communicate other information to the HMD headset 118 via a USB 2.0 or 3.0 bus. When the dGPU is not transmitting data to the HMD headset 118 via a DisplayPort bus, it may communicate data via a USB 2.0 or 3.0 bus to a peripheral device attached to the USB-C port 212. The multiplexer circuit 1 242 may allow for transmission of data from the dGPU 114 to the USB-C port 212 via USB 244 when the dGPU 114 is transmitting data to the USB-C port 212 via DisplayPort buses 222 and 224 when an HMD headset 118 or other device requiring use of the dGPU 114 is detected. The USB-C controller 126 may instruct the multiplexing circuit 242 in an embodiment to operably connect the dGPU 114 to the USB-C port 212 via USB 240 and 244. Conversely, the USB-C controller 126 may instruct the multiplexing circuit 242 in an embodiment to disallow an operable connection between the dGPU 114 and the USB-C port 212 via USB 240 and 244 when a device is connected that need not utilize the dGPU 114. The USB-C controller 126 may instruct the operation of the multiplexing circuit 242 pursuant to code instructions of the hybrid USB-C head mounted display interface management system to transmit data via USB 246 in an embodiment.

In yet other aspects of an embodiment, a power controller 248 may be operably connected to the USB-C controller 126, the USB-C port 212, and the Thunderbolt® port 216. The power controller 248 in an embodiment may operate to provide added power to the head mounted display headset (e.g. via USB 238). For example, the power controller 248 may be operably connected to the USB-C port 212 via VBUS 252, operably connected to the USB-C controller via VBUS 254, and may be operably connected to the Thunderbolt® port 216 via I2C 250. The power controller 248 in an embodiment may operate to provide up to 15 Watts of power to the head mounted display headset 118 via VBUS 252 and the USB-C port 212. Additional power generated by the power controller 248 in an embodiment may also be transferred to the USB-C controller 126 via VBUS 254 and to the Thunderbolt(4) port 216 via USBs 250 and 232. Further, the USB-C controller 126 may operate to instruct the power controller 248 to provide such power, to set the amount of power provided, and to instruct where the power controller 248 should send such additional power.

In yet other aspects of an embodiment, a platform controller hub (PCH) 256 may operate to support the integrated GPU (iGPU 102). The PCH 256 may be operably connected to both the Thunderbolt® port 216 and the USB-C controller 126 via USB 226 in an embodiment. The PCH 256 may be operably connected to the iGPU 102 in an embodiment via the Thunderbolt® port 216, USB 226, and PEG bus 220. In still further aspects of an embodiment, an embedded controller 258 may operate to receive data from one or more external sensors (not shown), and to transmit data to and from the USB-C controller 126 via system management bus (SMB) 260. The hybrid USB-C head mounted display interface management system in an embodiment may reside within the USB-C controller 126, CPU/iGPU 102, PCH 256, or the embedded controller 258.

Figure 3:
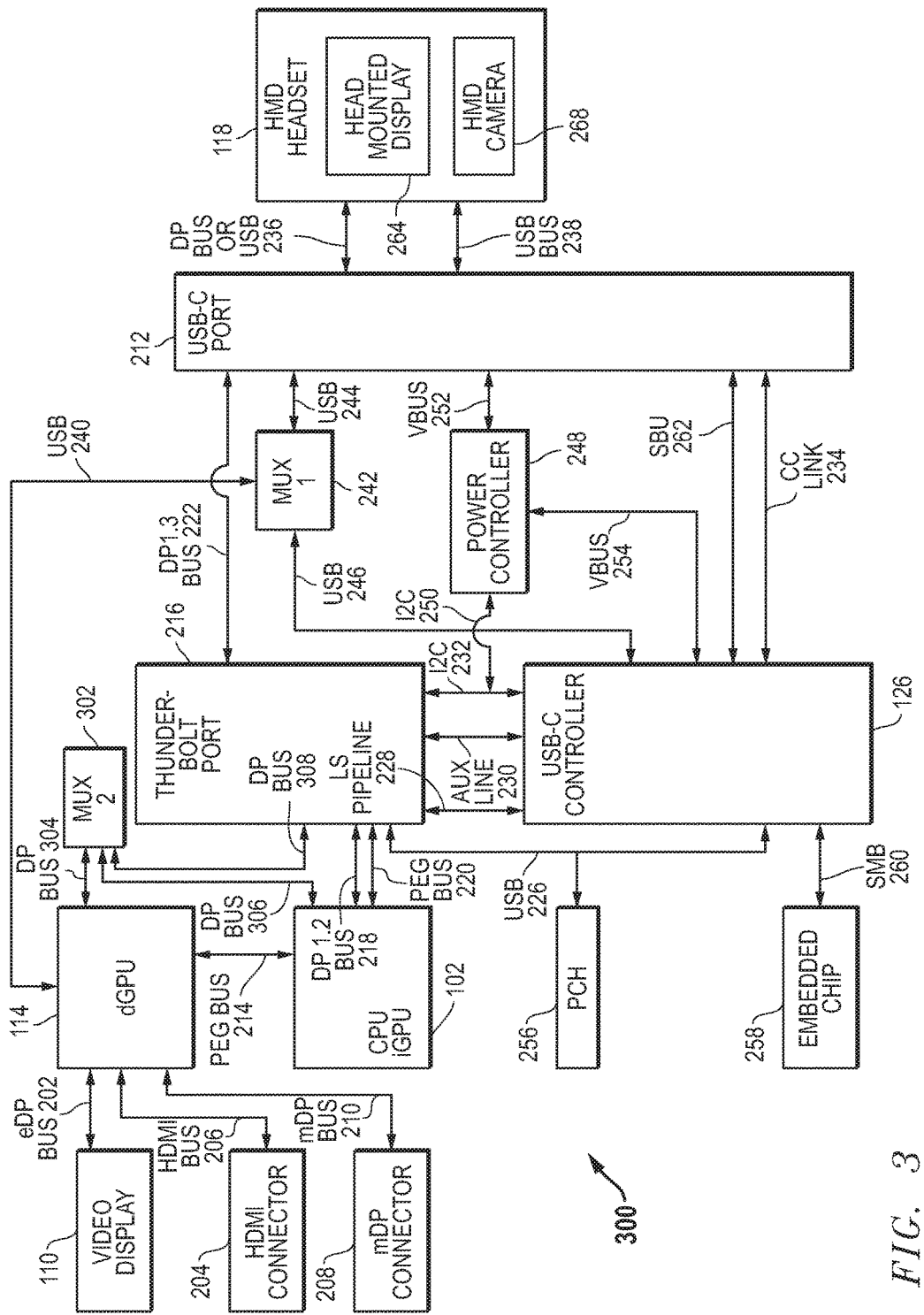
FIG. 3 is a block diagram of a hybrid USB-C port architecture for interface with a head mounted display headset according to a second embodiment of the present disclosure.

FIG. 3 is a block diagram of a hybrid USB-C port architecture for DisplayPort interface with a head mounted display headset according to a second embodiment of the present disclosure. The system of FIG. 3 works similarly to that of FIG. 2. However, in some embodiments of the present disclosure, the dGPU 114 may be operably connected to the Thunderbolt® port 216 via a multiplexing circuit 302, rather than a direct DisplayPort bus 224, as described with reference to FIG. 2. As described before, the Thunderbolt® port 216 is a type of high throughput data translation hub and may be replaced by another type of high throughput data translation hub in other embodiments of the presently described hybrid USB-C port architecture shown in FIG. 3 as described for FIG. 2. As before and in embodiments throughout the present disclosure, it will be understood that reference to the Thunderbolt® port such as 216 may similarly refer to another type of high throughput data translation hub with similar function in variations of the embodiments described herein. As shown in FIG. 3, the hybrid USB-C port architecture 300 in an embodiment may include a multiplexing circuit 302 operably connected to the dGPU 114 via DisplayPort bus 304, the iGPU 102 via DisplayPort 1.2 bus 306, and the Thunderbolt® port 216 via DisplayPort bus 308. In this way, high bandwidth lanes from the Thunderbolt® port 216 may be optionally connected to dGPU 114 or may be connected via DisplayPort 1.2 bus 306 to CPU/iGPU 102. The hybrid architecture 300 continues to allow for the dedicated discrete graphics processing unit (dGPU) 114 to operably connect to the USB-C port 212 via one or more buses conforming to the DisplayPort specification set by the Video Electronics Standards Association. Version 1.3 of the DisplayPort specification allows for the transmission of display graphics signals via four lanes per data line, at a rate of 8.1 Gbit/s per lane, giving a total bandwidth of 32.4 Gbit/s per data line. For example, the embedded DisplayPort (eDP) bus 202 operably connecting the dGPU 114 with the video display 110 may conform to the DisplayPort specification. Display graphics transmitted via a bus conforming to Version 1.3 of the DisplayPort specification may be of a higher quality than display graphics transmitted via buses conforming to the earlier version 1.2 of the DisplayPort specification, High Definition Multimedia Interface (HDMI) specification, or Peripheral Component Interface Express Graphics (PEG) specification.

As described herein, dedicating a majority of the high bandwidth lanes available for connectivity between the Thunderbolt® port 216 and components located on its chip side (e.g. dGPU 114 and CPU/iGPU 102) to connectivity with the dGPU 114 in an embodiment may allow for transmission of higher-quality graphics information from the dGPU 114 to the HMD headset 118. This benefit may come at the cost of fewer high bandwidth lanes dedicated to the CPU/iGPU 102 in comparison to previous solutions. Further, communication between the dGPU 114 and the HMD headset 118 in an embodiment may require greater power consumption than communication between the CPU/iGPU 102 and the HMD headset 118. Thus, graphics processing functions not related to generation and transmission of high-quality images (e.g. 4K resolution images) for the HMD headset 118, such as when other peripheral devices not requiring as much graphics processing capability in an embodiment may be relegated to the CPU/iGPU 102 at times. For example, the CPU/iGPU 102 in an embodiment may perform graphics processing functions relating to generation of high definition graphics images not adhering to the 4K resolution for display via a peripheral video display other than the HMD headset 118. In an embodiment in which such graphics processing functions may be performed by the CPU/iGPU 102 in an embodiment, a solution is needed to dynamically assign more high bandwidth lanes connecting to the chip side of the Thunderbolt® port 216 to the CPU/iGPU 102. Some graphics-processing functions not related to generation and transmission of high-quality images in an embodiment may include, for example, manipulation of primitives within a three-dimensional virtual space based on positional information received from the HMD headset 118 or HMD camera 268 via USB bus 238 for example. Coordination of the image data with sensors or HMD camera 268 data is utilized for operation of the HMD headset 118.

The hybrid USB-C head mounted display interface system in an embodiment may address this issue by instructing a multiplexing circuit 302 to operate according to various states, depending on the functionality of the dGPU 114 and the CPU/iGPU 102 at a given time. The multiplexing circuit 302 in an embodiment may operate according to two different states. In a first state, the multiplexing circuit 302 may operate to connect the dGPU 114 to the Thunderbolt® port 216 via DisplayPort bus 304 and DisplayPort bus 308. When the multiplexing circuit 302 in an embodiment is placed in such a first state, the display graphics data may be transmitted between the dGPU 114 and the Thunderbolt® port 216 at a bandwidth of up to 8.1 Gbit/s across eight lanes, in accordance with the DisplayPort standard.

In a second state, the multiplexing circuit 302 may operate to connect the iGPU 102 to the Thunderbolt® port 216 via DisplayPort 1.2 bus 306 and DisplayPort bus 308. When the multiplexing circuit 302 in an embodiment is placed in such a second state, the display graphics data may be transmitted between the iGPU 102 and the Thunderbolt® port 216 at a bandwidth of up to 5.7 Gbit/s across eight lanes, in accordance with the DisplayPort 1.2 standard. Operation of the multiplexing circuit 302 in such a second state according to instructions of the hybrid USB-C head mounted display interface management system in an embodiment may thus dynamically assign more high bandwidth lanes connecting to the chip side of the Thunderbolt® port 216 to the CPU/iGPU 102 when graphics processing functions not related to generation and transmission of high-quality images (e.g. 4K resolution images) to the HMD headset 118 are being performed by the CPU/iGPU 102. In such a way, the hybrid USB-C head mounted display interface management system in an embodiment may allow for transmission of higher quality image information from the dGPU 114 to the HMD headset 118 when such a transmission is taking place, and allow for operable connection between the CPU/iGPU 102 and the HMD headset 118 when such a transmission is not taking place. Dynamically switching between these states may also allow for conservation of power required to operate the dGPU 114 in an embodiment when the less power-hungry CPU/iGPU 102 may be employed.

Alternatively, when the multiplexing circuit 302 in an embodiment is placed in such a second state, display graphics data may be transmitted between the dGPU 114 and the Thunderbolt® port 216 via the iGPU 102. In such an embodiment, the display graphics data may be transmitted between the dGPU 114 and the Thunderbolt® port 216 via PEG bus 214 (connecting the dGPU 114 and the iCPU 102), via DisplayPort 1.2 bus 306 (connecting the iGPU 102 and the multiplexing circuit 302), and via DisplayPort bus 308 (connecting the multiplexing circuit 302 and the Thunderbolt® port 216. In such an embodiment, the bandwidth of the transmission of data between the dGPU 114 and the Thunderbolt® port 216 may be limited by the maximum bandwidth achievable by the lowest bandwidth bus in the series of buses described directly above. For example, dGPU 114 and Thunderbolt® port 216 may be operably connected via a series of buses including the PEG bus 214, the DisplayPort 1.2 bus 306, and the DisplayPort bus 308. The PEG bus 214 and the DisplayPort 1.2 bus 306 are capable of maximum bandwidths that are lower than the maximum bandwidth allowed by the DisplayPort bus 308. As such, when the multiplexer is placed in such a second state, display graphics data may be transferred between the dGPU 114 and the Thunderbolt® port 216 at a lower bandwidth than that allowed by the DisplayPort standard.

Transmission of display graphics data via the DisplayPort 1.2 standard in an embodiment may limit the ultimate display quality of the display graphics transmitted, as described herein. However, transmission of display graphics at the higher bandwidth associated with the DisplayPort standard may require more power than transmission of display graphics at the lower bandwidth associated with the DisplayPort 1.2 standard. Thus, situations may arise in which transmission of display graphics at the lower bandwidth may be preferred to transmission of display graphics at the higher, more power-hungry bandwidth. The multiplexing circuit 302 in an embodiment may provide the ability to toggle between these two states depending on current operating states of the architecture 300.

The USB-C controller 126 executing code instructions of the hybrid USB-C head mounted display interface management system may instruct the multiplexing circuit 302 to operate in a first or second state. For example, the USB-C controller 126 may execute code instructions received from hybrid USB-C head mounted display interface management system to place the multiplexing circuit 302 in a first state or a second state. Such state-operation instructions may be transmitted from the USB-C controller 126 to the multiplexing circuit 302 in an embodiment via the Thunderbolt® port 216. For example, the USB-C controller 126 in an embodiment may transmit such state-operation instructions to the Thunderbolt® port 216 via USB 226, LS PipeLine 228, auxiliary line (AUX) 230, or I2C line 232 in an embodiment. The Thunderbolt® port 216 in such an embodiment may then transmit the state-operation instructions to the second multiplexing circuit 302 via DisplayPort bus 308 or another connection in various embodiments.

On the USB-C connector side of Thunderbolt® port 216, embodiments of the present disclosure provide more direct connection from the dGPU 114 to the USB-C port 212 as described above with FIG. 2. Further, routing through an iGPU may be optionally eliminated as described above. For example, the dGPU 114 in an embodiment may be operably connected to the Thunderbolt® port 216 via DisplayPort bus 308, multiplexing circuit (MUX 2) 302, and DisplayPort bus 304. The Thunderbolt® port 216 in such an embodiment may then operably connect to the USB-C port 212 via the DisplayPort bus 222. In such a way, each of the buses operably connecting the dGPU 114 to the USB-C port 112 in an embodiment may be capable of transmitting display graphics data at the higher bandwidth allowed by the DisplayPort specification.

The USB-C port 212 in an embodiment may be capable of operating according to multiple modes as described above for FIG. 2. For example, the USB-C port 212 in an embodiment may include several pin connectors capable of receiving different types of data depending on the state in which they are placed. Two pairs of pin connectors of the USB-C port 212 in an embodiment may operate according to a default mode to receive USB 3.0 or USB 3.1 data, which is associated with a lower bandwidth than DisplayPort data. Similarly, two pairs of pin connectors of the USB-C port 212 in an embodiment may operate according to the default mode to transmit USB 3.0 or USB 3.1 data. However, each of these four total pairs of pin connectors of the USB-C port 212 may also operate according to an alternate mode to either transmit or receive data conforming to the higher bandwidth DisplayPort specification.

As previously described, the USB-C controller 126 in an embodiment may operate to execute machine-readable code instructions of the hybrid USB-C head mounted display interface management system to instruct the USB-C port 212 to operate according to either the default mode or the alternate mode. In alternative embodiments, embedded chip 258 may operate machine-readable code instructions of the hybrid USB-C head mounted display interface management system via USB-C controller 126. The USB-C port 212 in an embodiment may initially operate according to a default mode in which one or more toggle capable pairs of pins may operate to transmit data via a USB 2.0 or 3.0 data bus. In an example embodiment, the USB-C controller 126 may execute code instructions of the hybrid USB-C head mounted display interface management system to instruct the USB-C port 212 to switch to an alternate mode when it is determined display graphics data is being transmitted between the dGPU 114 and the head mounted display headset 118. When operating in the alternate mode, one or more of the toggle-capable pairs of pins within the USB-C port 212 in an embodiment may operate to transmit data via a DisplayPort bus 236. Two separate scenarios may indicate display graphics data is being transmitted between the dGPU 114 and the head mounted display headset 118 in an embodiment. For example, operably connecting the head mounted display headset 118 to the USB-C port 212 via a USB-C link capable of transmitting and receiving data according to the DisplayPort specification may indicate the transfer of display graphics data between the dGPU 114 and the head mounted display headset 118 may be occurring. As another example, the Thunderbolt® port 216 receiving display graphics data from the dGPU 114 via DisplayPort bus 308 may indicate the transfer of display graphics data between the dGPU 114 and the head mounted display headset 118 may be occurring.

The USB-C controller 126 in such an embodiment may be capable of detecting when either of these scenarios are occurring. For example, the USB-C controller 126 in an embodiment may be operably connected to the USB-C port 212 via the data bus conforming to USB-C standards for the configuration channel (CC link) 234 and via the data bus Sideband Use (SBU) under the USB-C standard 262. The USB-C port 212 in an embodiment may operate to detect when the head mounted display headset has connected to the USB-C port 212 via a USB-C line capable of receiving display graphics data according to the DisplayPort specification, and transmitting notification of such a connection to the USB-C controller 126 via either the SBU 262 or the CC link 234 as described in embodiments herein. As another example, the USB-C controller 126 in an embodiment may be operably connected to the Thunderbolt® port 216 via a USB 226 (e.g. USB 2.0 or USB 3.0), via an LS pipeline 228, via an auxiliary line 230, and/or via an I2C line 232. The USB-C controller 126 in an embodiment may receive an indication via one or more of these lines that DisplayPort specification bus 224 is being used to transfer display graphics data between the dGPU 114 and the Thunderbolt® port 216. Receipt of an indication that either of these scenarios are occurring may prompt the USB-C controller 126 in an embodiment to execute code instructions of the hybrid USB-C head mounted display interface management system to place the USB-C port 212 in an alternate mode in which it may dedicate one or more pairs of ports to the receipt and/or transmission of display graphics data conforming to the DisplayPort standard.

In various embodiments, the USB-C controller 126 may be operably connected to the USB-C port 212 via one or more buses. For example, CC link 234 and/or Side-Band Signal Control (SBU) bus 262 may operably connect the USB-C controller 126 and the USB-C port 212 in an embodiment. Upon determining the USB-C port 212 should be operating according to the alternate mode in an embodiment, the USB-C controller 126 may execute code instructions of the hybrid USB-C head mounted display interface management system to transmit a command instruction to the USB-C port 212, via CC link 234, to instruct the USB-C port 212 to operate according to the alternate mode such as indicating an HMD headset 118 has been connected as indicated by a device identifier according to the USB-C standard. In response to such a command, the USB-C port 212 in an embodiment may set one or more pairs of toggle-capable pin connectors operably connected with bus 222 to receive data according to the DisplayPort standard. The USB-C port 212 in an embodiment may further set another one or more pairs of toggle-capable pin connectors operably connected to bus 236 to transmit data according to the DisplayPort standard. In another aspect of such an embodiment, the USB-C port 212 may respond to such an instruction by setting the one or more pairs of toggle-capable pin connectors operably connected with bus 236 to receive data according to the DisplayPort standard and set the one or more pairs of toggle-capable pin connectors operably connected with bus 222 to transmit data according to the DisplayPort standard. By setting the one or more pairs of pin connectors of the USB-C port 212 to operate in such a way, the bus 222 and the bus 236 effectively become DisplayPort buses capable of transmitting and receiving data at 1.8 Gbit/s across four lanes for each data line.

As described herein, the dGPU 114 may be directly connected to the Thunderbolt® port 216 via a DisplayPort specification buses 304 and 308 via multiplexing circuit 302, and the Thunderbolt® port 216 may be operably connected to the USB-C port 212 via bus 222. Bus 236 may operably connect the USB-C port 212 to the head mounted display headset 118 in an embodiment. In such a way, the dGPU 114 may transmit display graphics data to the head mounted display headset 118 via a series of buses, all operating according to the DisplayPort specification at a bandwidth of 1.8 Gbit/s across each of four lanes per data line. This bandwidth is high enough to support display via the head mounted display headset at the 4K resolution with a refresh rate of up to 120 Hz. This bandwidth may also support display at a resolution of 5120×2880 (5K UHD) with a refresh rate of 60 Hz, and a resolution of 7680×4320 pixels (8K UHD) with a refresh rate of 30 Hz as described above.

As described above for FIG. 2, the Thunderbolt® port 216 may also have DisplayPort 1.2 bus 218 having one data line with four lanes may operably connect the CPU/iGPU 102 to the chip side of the Thunderbolt® port 216. This may permit the Thunderbolt® port 216 to also operably connect to other components on its chip side. Four high bandwidth lanes (e.g. DisplayPort 1.2 bus 218) to connecting the CPU/iGPU 102 to the USB-C port 212 which may reduce the number of high bandwidth lanes connecting the CPU/iGPU 102 to the USB-C port 212 in comparison to previous solutions. However with the optional operational mode of multiplexing circuit 302, DisplayPort 1.2 bus 306 may be implemented to restore bandwidth to CPU/iGPU 102 from the USB-C port 212. Thus, transmission of higher-quality graphics information from the dGPU 114 to the HMD headset 118 and/or to other peripheral displays may be provided or utilization of full bandwidth to the CPU/iGPU 102 may be available depending on mode of multiplexing circuit 302 in various embodiments.

The USB-C port 212 in an embodiment may further connect to the head mounted display headset 118 via bus 238, which may operate at all times according to either the USB 2.0 or USB 3.0 standard as described. In other embodiments, bus 238 may operate according to any current or future implementation of the USB standard, including USB 3.1 and USB 3.2. Connection of the head mounted display headset 118 to the USB-C port 212 via the USB bus 238 in an embodiment may allow for transmission of information from the head mounted display headset 118 to the dGPU 114. For example, the HMD headset 118 may transmit positional information of the HMD headset 118 to the dGPU 114 via USB 236, such that the dGPU 114 can effectively synchronize images it renders with the perspective from the image should be viewed from within the HMD headset 118. Additionally, USB bus 238 may operate to service HMD camera 268 when coordination of camera images and display data on head mounted display 264 is conducted. USB-C port 212 in an embodiment may operate to receive and transmit data via bus 236 through one or more pin connectors while simultaneously receiving or transmitting data via bus 238 through a separate one or more pin connectors. Thus, when operating in an alternate mode, the USB-C port 212 may be capable of transmitting and receiving data to or from the head mounted display headset 118 via both a DisplayPort specification compliant bus and a USB compliant bus (e.g. USB 2.0 or USB 3.0). In other aspects, when operating in an alternate mode, the USB-C port 212 may be capable of transmitting and receiving data to or from the head mounted display headset 118 via a DisplayPort specification compliant bus and receiving power from a power controller 248 via USB 238, using a single USB-C cord connecting the head mounted display headset 118 and the USB-C port 212.

In other aspects of an embodiment, the dGPU 114 is operably connected to a multiplexing circuit (MUX 1) 242 via a USB 240. USB 240 may provide for transmission and reception of data such as positional data or camera data from the HMD headset 118 received via USB bus 238. The multiplexing circuit 242 may also be operably connected to the USB-C controller 126 via USB 246 and to the USB-C port 212 via USB 244. In an embodiment, the multiplexing circuit 242 may operate according to two separate states. In a first state, the multiplexing circuit 242 may operably connect the dGPU 114 to the USB-C port via USB 240 and USB 244 via USB 2.0 or 3.0 which operates along with DisplayPort bus 222 to transmit high-quality display graphics information to the HMD headset 118 from dGPU 114.

In a second state, the multiplexing circuit 242 may sever the connection between the USB-C port 212 and the dGPU 114 via USB 240. When the dGPU is not transmitting data to the HMD headset 118 via a DisplayPort bus, it may communicate data to a device attached to the USB-C port 212 via a USB 2.0 or 3.0 bus. The USB-C controller 126 may instruct the multiplexing circuit 242 in an embodiment to operably connect the USB-C port 212 via USB 246 and 244 when the dGPU 114 is not actively transmitting information to the USB-C port 212 via DisplayPort buses 222 and 224 indicating another type of peripheral device connected to USB-C port 212. The USB-C controller 126 may instruct the operation of the multiplexing circuit 242 pursuant to code instructions of the hybrid USB-C head mounted display interface management system transmitted via USB 246 in an embodiment.

In yet other aspects of an embodiment, a power controller 248 may be operably connected to the USB-C controller 126, the USB-C port 212, and the Thunderbolt® port 216. The power controller 248 in an embodiment may operate to provide added power to the head mounted display headset or other attached devices (e.g. via USB 238). For example, the power controller 248 may be operably connected to the USB-C port 212 via VBUS 252, operably connected to the USB-C controller via VBUS 254, and may be operably connected to the Thunderbolt® port 216 via USB 250. The power controller 248 in an embodiment may operate to provide up to 15 Watts of power to the head mounted display headset 118 via VBUS 252 and USB-C port 212. Additional power generated by the power controller 248 in an embodiment may also be transferred to the USB-C controller 126 via VBUS 254 and to the Thunderbolt(4) port 216 via USBs 250 and 232. Further, the USB-C controller 126 may operate to instruct the power controller 248 to provide such power, to set the amount of power provided, and to instruct where the power controller 248 should send such additional power.

In yet other aspects of an embodiment, a platform controller hub (PCH) 256 may operate to support the integrated GPU (iGPU 102). The PCH 256 may be operably connected to both the Thunderbolt® port 216 and the USB-C controller 126 via USB 226 in an embodiment. The PCH 256 may be operably connected to the iGPU 102 in an embodiment via the Thunderbolt® port 216, USB 226, and PEG bus 220. In still further aspects of an embodiment, an embedded controller 258 may operate to receive data from one or more external sensors (not shown), and to transmit data to and from the USB-C controller 126 via system management bus (SMB) 260. The hybrid USB-C head mounted display interface management system is described as operating in USB-C controller 126 in one embodiment. In various embodiments, the machine-readable code may be executed via the USB-C controller 126, CPU/iGPU 102, PCH 256, or the embedded controller 258.

Figure 4:
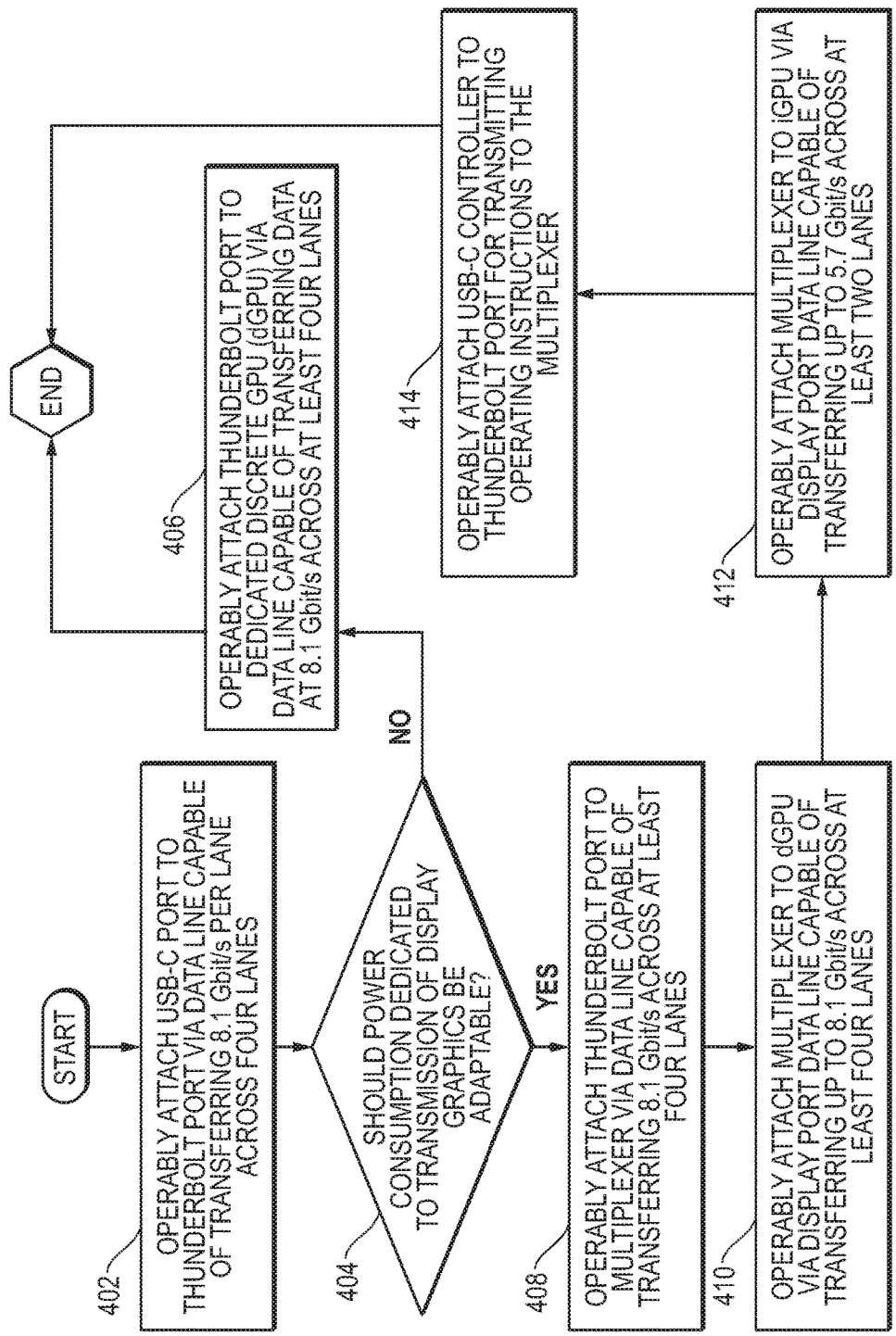
FIG. 4 is a flow diagram illustrating a method of operably connecting a dedicated discrete graphics processing unit (dGPU) and a USB-C port via a bus conforming to the DisplayPort standard according to an embodiment of the present disclosure.

FIG. 4 is a flow diagram illustrating a method of operably connecting a dedicated discrete graphics processing unit (dGPU) and a USB-C port capable of further connecting to a head mounted display headset via a bus conforming to the DisplayPort standard according to an embodiment of the present disclosure. As described herein, previous architectures limited the bandwidth of display graphics data transmitted between a dGPU and a head mounted display headset to the maximum bandwidth allowable by the DisplayPort 1.2 standard, the PEG standard, or the HDMI standard. Several previous embodiments required additional ports in an information handling system or additional hardware to accommodate a head mounted display device. Embodiments of the present disclosure provide an architecture in which display graphics data may be transmitted between a dGPU and a head mounted display headset via a USB-C port at a higher bandwidth such as is allowable by the DisplayPort standard, such that higher quality graphics may be displayed at the head mounted display headset via operation with a additional graphics processing power of dGPU. A USB-C port may provide for a multi-use, flexible connector for use with the head mounted display headset device and, in some cases, mollify the need for additional cabling for USB connection to support sensors or camera systems on the head mounted display headset.

At block 402, in an embodiment, a USB-C port may be operably connected to a Thunderbolt® port via a data line capable of transferring 8.1 Gbit/s per lane across four lanes. For example, in embodiments described with reference to FIGS. 2 and 3, the Thunderbolt® port 216 or other high throughput data translation hub may be operably connected to the USB-C port 212 via a bus 222 capable of operating according to either the USB standard (e.g. USB 2.0, USB 3.0, and/or USB 3.1) or the DisplayPort standard. The DisplayPort standard, such as version 1.3 in one example, requires data buses to be capable of transmitting data at a rate of 8.1 Gbit/s across four lanes, for a total bandwidth of 32.4 Gbit/s. This bandwidth is high enough to support display via a head mounted display headset operably connected to the USB-C port 212 via a DisplayPort bus of graphics at the 4K resolution with a refresh rate of up to 120 Hz. This bandwidth may also support display at a resolution of 5120×2880 (5K UHD) with a refresh rate of 60 Hz, and a resolution of 7680×4320 pixels (8K UHD) with a refresh rate of 30 Hz. In contrast, previous architectures provided a maximum bandwidth of 5.4 Gbit/s across four lanes, which was high enough to support the 4K resolution at a lower refresh rate of 60 Hz, and could not support 5K or 8K resolution at all.

It may be determined at block 404 in an embodiment whether flexibility to utilize high bandwidth capacity of a Thunderbolt® port with both a dGPU and a iGPU should be provided such that higher or lower power consumption dedicated to processing and transmission of display graphics should be adaptable depending on the type of peripheral device detected at a USB-C port such as 212. For example, when a head mounted display device or other peripheral device requiring 4K graphics capabilities for better performance is detected as attached to the USB-C port, utilization of a dedicated dGPU and high bandwidth busses such as DisplayPort capable bus connections may be activated. If another type of peripheral device is detected at the USB-C port, then lower graphics processing capability and graphics data bandwidth may be acceptable while a gain in power efficiency with less power consumption may be realized with lower bandwidth connectivity to an iGPU. As described herein, processing and transmission of display graphics data between the dGPU and the head mounted display headset on buses capable of the higher bandwidth associated with the DisplayPort standard may result in higher quality images being displayed at the head mounted display headset in comparison to transmission via one or more lower-bandwidth buses (e.g. DisplayPort 1.2, PEG, or HDMI). However, the utilization of the dGPU graphics processor to process and transmit display graphics on buses capable of such a higher bandwidth may also result in greater power consumption than transmission of display graphics on lower-bandwidth buses and utilization of an integrated GPU. Thus, it may be optimal in some scenarios to be capable of switching between these two different options of graphics processing and utilization of busses dependent on the type of device detected as connected to the USB-C port. In some embodiments, determination of options to use may be dependent upon the amount of power available. In other embodiments, a decision to utilize higher power consuming graphics processing may be based on types of display devices connected via the USB-C port such that higher bandwidth busses are invoked in connection to a dGPU. For example, if the architecture will be incorporated within a laptop computing device or other mobile device expected to run on battery power, it may be optimal to be able to toggle between these two high power or low power graphics processing options when the system is expected to be running on battery power in some embodiments. If it is determined that power consumption dedicated to graphics processing and transmission of display graphics should not be adaptable in an embodiment, the method may proceed to block 406. If it is determined that power consumption dedicated to transmission of display graphics should be adaptable in an embodiment, the method may proceed to block 408.

At block 406, in an embodiment in which it has been determined flexible bandwidth options are not needed between the different graphics processing resources which have differing levels of power consumption dedicated to processing and transmission of display graphics, then the Thunderbolt® port may be operably attached to the dedicated discrete graphics processing unit (dGPU) via a data line capable of transferring data at 8.1 Gbit/s across at least four lanes. In such a way, because the Thunderbolt® port may be operably connected to the USB-C port via a similar line at block 402, the dGPU may be permanently operably attached to the USB-C port via a plurality of buses that are each capable of transferring data at 8.1 Gbit/s across at least four lanes. For example, in an embodiment described with reference to FIG. 2, the dGPU 114 may be operably connected to the Thunderbolt® port 216 via DisplayPort bus 224, and the Thunderbolt® port 216 may be operably connected to the USB-C port 212 via DisplayPort bus 222. In such an embodiment, the dGPU 114 may be operably connected to the USB-C port 212 via DisplayPort buses 222 and 224, such that the dGPU 114 is capable of transmitting display graphics data at a bandwidth of 8.1 Gbit/s across four lanes at any time in which the USB-C port 212 is set to operate according to an alternate mode as described herein. Transmission of display graphics in such a way may ultimately allow for display of higher quality images at a head mounted display headset 118 operably connected to the USB-C port 212, but may also involve greater power consumption of the architecture 200. However, the less overall bandwidth from the Thunderbolt® port 216 to the iGPU that may be available may be an acceptable tradeoff since the higher power consuming dGPU may be more of a default option when power consumption is less of a consideration.

At block 408, in an embodiment in which it is determined bandwidth to GPU resources at varying power consumption levels for processing and transmission of display graphics should be adaptable, the Thunderbolt® port may be operably attached to a multiplexing circuit via a data line capable of transferring 8.1 Gbit/s across at least four lanes. For example, in an embodiment described with reference to FIG. 3, the multiplexing circuit 302 may be operably attached to the Thunderbolt® port 216 via DisplayPort bus 308 and from the Thunderbolt® port 216 to dGPU 114 via DisplayPort bus 304. The multiplexing circuit 302 in an embodiment may operate according to two different states. In a first state, the multiplexing circuit 302 may operate in an embodiment to connect the Thunderbolt® port 216 to one or more components via a DisplayPort busses 304, 308, 222, and 236 in order to maximize the quality of display graphics displayed at a head mounted display headset 118, at the cost of heightened power consumption. In a second state, the multiplexing circuit 302 in an embodiment may operate to connect the Thunderbolt® port 216 to one or more components via a lower-bandwidth busses (e.g. DisplayPort 1.2 306 or 218 or PEG 220) in order to utilize the lower power consuming iGPU in CPU 102 during graphics processing and transmission of display graphics data at the cost of lowering the quality of the graphics as displayed at a peripheral device attached to USB-C port 212 with lower graphics requirements.

The multiplexer in an embodiment may be operably attached to the dGPU via a DisplayPort data line capable of transferring up to 8.1 Gbit/s across at least four lanes at block 410. For example, in an embodiment described with reference to FIG. 3, the multiplexing circuit 302 may be operably attached to the dGPU 114 by DisplayPort bus 304. In such a configuration, the multiplexing circuit 302 may operate in a first state to connect the dGPU 114 to the Thunderbolt® port 216 via DisplayPort bus 304 and DisplayPort bus 308. When the multiplexing circuit 302 in an embodiment is placed in such a first state, the display graphics data may be transmitted between the dGPU 114 and the Thunderbolt® port 216 at a bandwidth of up to 8.1 Gbit/s across four lanes, in accordance with the DisplayPort standard. Thus, display graphics data may be transmitted between the dGPU 114 and the USB-C port 212 via the Thunderbolt® port 216 in an embodiment at a high bandwidth of 8.1 Gbit/s per lane, allowing for high resolution display at an attached peripheral device such as the head mounted display headset 118. However, the transmission of display graphics data between the dGPU 114 and the USB-C port 212 in such an embodiment may consequently result in more power consumed.

At block 412, the multiplexer in an embodiment may be operably attached to an integrated graphics processing unit (iGPU) via a DisplayPort data line capable of transferring up to 5.7 Gbit/s across four lanes. For example, in an embodiment described with reference to FIG. 3, the multiplexing circuit 302 may be operably attached to the iGPU 102 via DisplayPort 1.2 bus 306. In such a configuration, the multiplexing circuit 302 may operate according to a second state to connect the iGPU 102 to the Thunderbolt® port 216 via DisplayPort 1.2 bus 306 and DisplayPort bus 308. Because the highest possible bandwidth for the transmission of data across a plurality of buses placed in series is limited by the bus within the series having the lowest bandwidth, all signals transmitted between the iGPU 102 and other components via the Thunderbolt® port 216 are limited to a bandwidth of 5.7 Gbit/s per lane associated with the DisplayPort 1.2 standard. Thus, display graphics data transmitted between the iGPU 102 and the USB-C port 212 via the Thunderbolt® port 216 in an embodiment may be limited to a lower-bandwidth of 5.7 Gbit/s per lane. However, the transmission of display graphics data between the iGPU 102 and the USB-C port 212 in such an embodiment may consequently result in less power consumed which may be acceptable for peripheral devices detected as attached to the USB-C port 212 with lower graphics requirements. For example, the lower power graphics option of the iGPU/CPU 102 may be selected when it is determined that there is not a head mounted display device 118 attached at USB-C port 212 whereas the high bandwidth bus 304 is activated by the multiplexer circuit 302 when a head mounted display device 118 is detected as attached.

At block 414, in an embodiment, a USB-C controller may be operably attached to the Thunderbolt® port for transmitting operating instructions to the multiplexer according to code instructions of the hybrid USB-C head mounted display interface management system. For example, in an embodiment described with reference to FIG. 3, the USB-C controller 126 may be operably attached to the Thunderbolt® port 216 via USB 226, LS Pipeline 228, auxiliary line 230, and/or I2C line 232. The USB-C controller 126 in such an embodiment may execute code instructions of the hybrid USB-C head mounted display interface management system to transmit an instruction to the multiplexing circuit 302 indicating whether the multiplexing circuit should operate in a first state to optimize graphics or in a second state to optimize power consumption. Determination may depend on the type of peripheral device detected at the USB-C port. Such an instruction may be transmitted in an embodiment from the USB-C controller 126 to the multiplexing circuit 302 via any one of the USB 226, LS Pipeline 228, auxiliary line 230, and/or I2C line 232.

When the USB-C controller 126 in an embodiment instructs the multiplexing circuit 302 to operate according to the first state to optimize graphics according to code instructions of the hybrid USB-C head mounted display interface management system, the multiplexing circuit may operate to operably connect the dGPU 114 to the Thunderbolt® port 216 via DisplayPort bus 304 and DisplayPort bus 306. In such a way, the Thunderbolt® port 216 may be capable of transmitting display graphics data between the dGPU 114 and the USB-C port 112 in conformance with the DisplayPort standard in an embodiment when the USB-C port 112 is placed in an alternate mode. When the USB-C controller 126 in an embodiment instructs the multiplexing circuit 302 to operate according to the second state to optimize power consumption according to code instructions of the hybrid USB-C head mounted display interface management system, the multiplexing circuit may operate to operably connect the iGPU 102 to the Thunderbolt® port 216 via DisplayPort 1.2 bus 306 and DisplayPort bus 308. In such a way, the Thunderbolt® port 216 may be capable of transmitting graphics data between the dGPU 114 and the USB-C port 112 in conformance with the lower-bandwidth DisplayPort 1.2 standard in an embodiment when the USB-C port 112 is placed in a default mode. At this point the design process may end.

Figure 5:
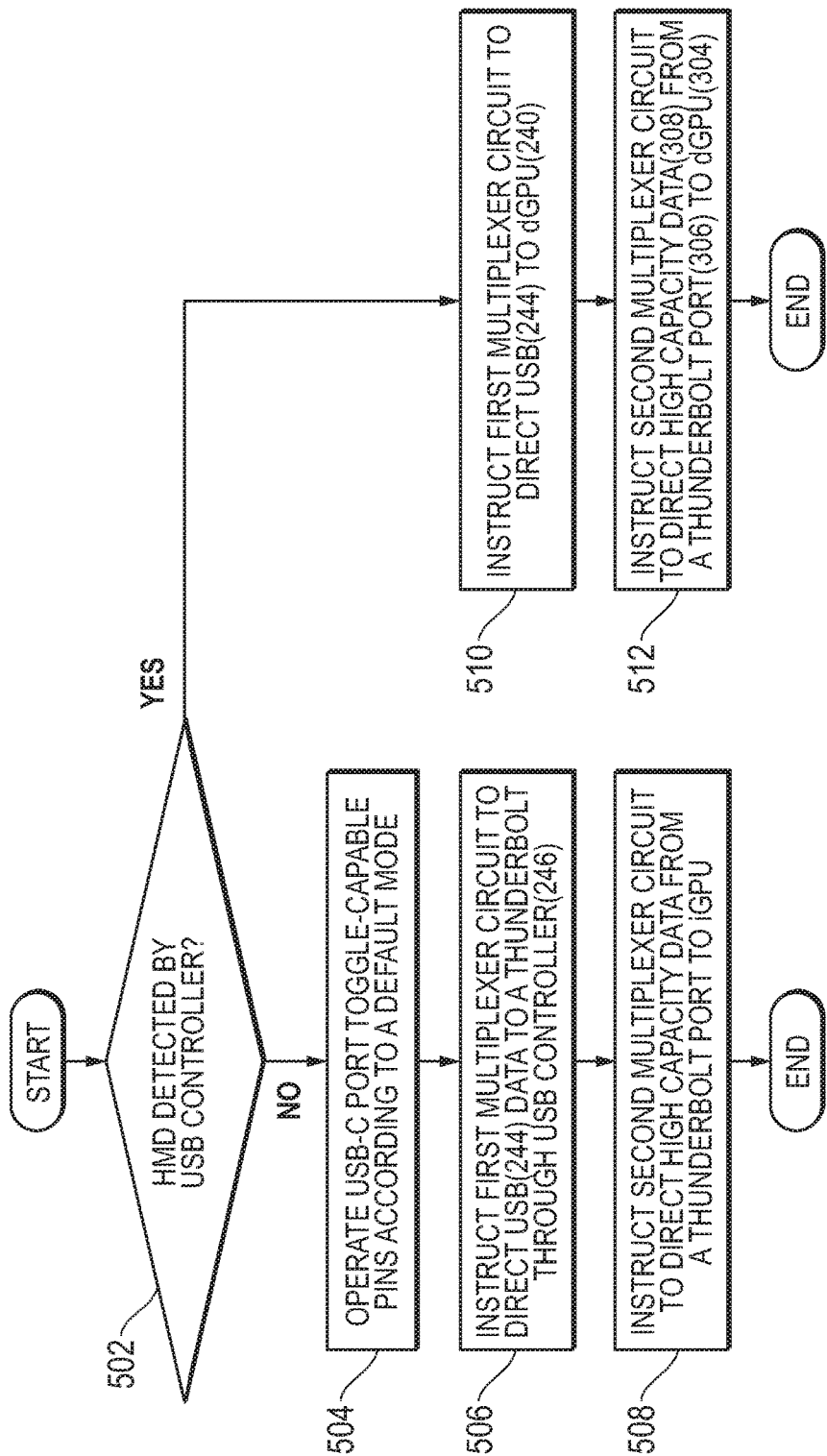
FIG. 5 is a flow diagram illustrating a method of instructing a hybrid USB-C port architecture to operate according to an alternate mode according to an embodiment of the present disclosure.

FIG. 5 is a flow diagram illustrating a method of instructing a Universal Serial Bus Type-C (USB-C) port to operate according to an alternate mode in which DisplayPort standard signals may be transmitted and/or received according to an embodiment of the present disclosure. The Thunderbolt® port in an embodiment may only deliver display graphics data transmitted from the dGPU to the USB-C port (for delivery to the head mounted display headset) if the USB-C port is placed in an alternate mode. As described herein, the hybrid USB-C port architecture of embodiments herein may be capable of operating according to multiple modes. For example, in an embodiment described with reference to FIGS. 2 and 3, the USB-C port 212 may include several toggle-capable pin connectors capable of receiving different types of data depending on the state in which they are placed. Two pairs of toggle-capable pin connectors of the USB-C port 212 in an embodiment may operate according to a default mode to receive USB 3.0 or USB 3.1 data, which is associated with a lower bandwidth than DisplayPort data. Similarly, two pairs of toggle-capable pin connectors of the USB-C port 212 in an embodiment may operate according to the default mode to transmit USB 3.0 or USB 3.1 data. However, each of these four total pairs of toggle-capable pin connectors of the USB-C port 212 may also operate according to an alternate mode to either transmit or receive data conforming to the higher bandwidth DisplayPort such as versions 1.2, 1.3, 1.4, or other future versions as well as provide a USB 2.0, 3.0, or other USB versions for connection of parallel data streams to a higher capacity graphics processing resource. For example, in the alternate mode, graphics processing may be used for a detected head mounted display such as 264 and for USB 2.0, 3.0, or other version connectivity of an HMD camera 268 or other sensor data to be routed to a dGPU such as 114 which may support graphics requirements of a head mounted display headset system such as 118. The method described with reference to FIG. 5 illustrates operation of a hybrid USB-C head mounted display interface management system for placement of the hybrid USB-C port architecture and these toggle-capable pin connectors of the USB-C port 212 in either a default mode or an alternate mode depending on the type of device detected as attached at the USB-C port 212 and the expected data levels to be received in an embodiment.

It may be determined at block 508 by the hybrid USB-C head mounted display interface management system in an embodiment whether the USB-C port 212 is attached to a peripheral device that requires receiving display data via bus with capacity such as a DisplayPort bus because the peripheral device has high graphics processing requirements. For example, a head mounted display (HMD) headset such as 118 may be such a device. For example, the USB-C controller 126 may detect the type of device attached to the USB-C port 212. When a peripheral device with high graphics processing requirements is attached, the hybrid USB-C port architecture may enter an alternate mode or a second mode to utilize a dGPU for additional graphics processing capability despite added power cost. The USB-C port 212 in an embodiment may receive data from the Thunderbolt® port or other high throughput data translation hub via a DisplayPort bus or via a DisplayPort 1.2 bus. For example, in an embodiment described with reference to FIG. 2, the Thunderbolt® port 216 may receive data from the dGPU 114 via DisplayPort bus 224. As another example, in such an embodiment, the Thunderbolt® port 216 may transmit or receive to or from the CPU/iGPU 102 via the DisplayPort 1.2 bus 218. As yet another example, in an embodiment described with reference to FIG. 3, the Thunderbolt® port 216 may receive data from the multiplexing circuit 302 via the DisplayPort bus 308. In such an embodiment, the multiplexing circuit 302 may operably connect the Thunderbolt® port 216 with either the dGPU 114 via DisplayPort bus 304 or the CPU/iGPU 102 via DisplayPort 1.2 bus 306. Thunderbolt® port 216 may then be operatively coupled to USB-C port 212 via a DisplayPort bus such as 222 in FIGS. 2 and 3.

In each of these example embodiments, the Thunderbolt® port 216 may allow for transmission of such data between the dGPU 114 or the CPU/iGPU 102 and the USB-C port 212 via DisplayPort bus 222. In yet another example, the head mounted display headset 118 in such an embodiment may transmit to or receive data from the USB-C port 212 via DisplayPort bus 236. The USB-C controller 126 in an embodiment may be capable of detecting via CC Link 234 or SBU 262 transmission between the USB-C port 212 and any of these components via DisplayPort bus 222 and/or DisplayPort bus 236. If the USB-C controller 126 detects the USB-C port attached to a device requiring utilization of the dGPU 114 and may be receiving data via a DisplayPort bus (e.g. DisplayPort bus 222 and/or DisplayPort bus 224 in FIG. 2 or DisplayPort bus 306 in FIG. 3), the method may proceed to block 510 to place the USB-C port toggle-capable connector pins in an alternate mode or a second mode. If the USB-C controller 126 does not detect the USB-C port is connected to a peripheral device requiring high graphics data processing and transmission capacity and thus may not be receiving data via a DisplayPort bus, the method may proceed back to block 504 such that the USB-C port toggle-capable connector pins continue to operate according to the default mode in order to operably connect to USB 3.0 or 3.1 buses or other USB buses. The designation of default or alternate or first versus second modes may be switched in other embodiments, and the selection of mode may be driven by the type of peripheral device detected by the USB-C controller 126 as being attached to the USB-C port 212 in various embodiments.

At block 504 the hybrid USB-C port architecture may be in a first mode or default mode such that USB-C port toggle-capable pins in an embodiment may operate according to a first mode. When placed in a first mode, these toggle-capable pin connectors may operate to transmit and/or receive data via one or more USB 3.0 or 3.1 buses. For example, in an embodiment described with reference to FIGS. 2 and 3, the USB-C port 212 may transmit or receive data or power from a device of lower graphics requirements than the combined HMD headset 118 with the HMD camera 268 and other sensors. Busses 236 and 238 may be utilized for the device detected as attached at the USB-C port 212. In another example, the USB-C port 212 in such an embodiment may transmit or receive data or power from the power controller 248 via VBUS 252. In yet another example, the USB-C port 212 in such an embodiment may transmit or receive data or power from the multiplexing circuit 242 via USB 244 and provide USB connectivity to the Thunderbolt® port via USB bus 246 and USB controller 126.

At 506, further when the hybrid USB-C port architecture is in the first mode the first multiplexer may be instructed to direct at least one channel of data to a USB controller for use with a CPU or GPU and for other purposes. In an example embodiment, the first multiplexer may be 242 as shown in FIGS. 2 and 3. First multiplexer circuit 242 may be instructed to direct USB data, such as USB 2.0, USB 3.0 or other USB formatted data, along USB 246 to USB-C controller 126. In such a scenario for the first mode, the option to direct some USB bandwidth of data along USB 240 to dGPU 114 is not selected due to higher power consumption required by processing via dGPU 114 in some embodiments. In certain aspects, a device or system attached at USB-C port 212 may not even require graphics processing. Thus, multiplexer circuit 242 may direct at least one channel of USB data to USB 246 and USB controller 126 instead.

Proceeding to 508 in some embodiments such as with FIG. 3, the system disclosed may have an optional second multiplexer as part of a hybrid USB-C port architecture. Although such a second multiplexer may add cost to the system, the benefit may be to provide an adaptable high bandwidth data path from the Thunderbolt® port to either the dGPU such as 114 or the CPU/iGPU such as 102 depending on needs. If the system with an optional second multiplexer operates in the default mode, the second multiplexer circuit may be instructed to direct high capacity data received from the Thunderbolt® to the lower power consuming CPU/iGPU. For example, Thunderbolt® port 216 may have some portion of its high capacity lines directed to dGPU 114, such as via DisplayPort busses 308 and 304 operatively coupled through multiplexer circuit 302 in FIG. 3. However, instead of having these high capacity lines only dedicated to dGPU 114, multiplexer circuit 302 may direct high capacity to CPU/iGPU 102 instead via DisplayPort 1.2 bus 306 when dGPU 114 may not be utilized. In the first mode for example, a peripheral device not requiring 4K capacity data throughput and processing may be detected at USB-C port 212. In such a situation, multiplexer circuit 302 may direct capacity from the Thunderbolt® port 216 the CPU/iGPU to provide for greater throughput to the lower power consuming graphics processing option and to the CPU as needed.

In each of these scenarios, the USB-C port 212 may operate according to the first mode at blocks 504, 506, and 508 in order to allow for receipt and/or transmission of data or power via one or more USB data lines at the toggle-capable pin connectors of the USB-C port 212. It will be understood that the designation as a first or default mode however may be switched with a designation as a second or alternate mode in other embodiments. In such an aspect, the default mode may become the scenario when a peripheral device is attached to USB-C port 212 requiring high capacity graphics processing and transmission throughput and utilization of a dGPU such as 114. For example, detection of a head mounted display headset device may be detected. The alternate mode may be for the peripheral devices that do not require as high a level of graphics processing or no graphics processing such that the CPU/iGPU 102 is sufficient.

At block 510 in an embodiment, hybrid USB-C port architecture may include operating the USB-C port toggle-capable pins according to an alternate mode. The USB-C controller 126 may execute code instructions of the hybrid USB-C head mounted display interface management system in an embodiment to place the USB-C port toggle-capable pins in the alternate mode. When placed in an alternate mode, these toggle-capable pin connectors may operate to transmit and/or receive data via one or more DisplayPort buses rather than USB 3.0 or 3.1 buses. For example, in an embodiment described with reference to FIGS. 2 and 3, the USB-C port 212 may transmit or receive graphics information from the HMD headset 118 via DisplayPort bus 236. In another example, the USB-C port 212 in such an embodiment may transmit or receive graphics information from the Thunderbolt® port 216 via DisplayPort bus 222.

If a head mounted display headset or other peripheral device requiring the dGPU is detected as attached at the USB-C port at step 502, flow proceeds to 510. At 510, in second or alternate mode of the hybrid USB-C port architecture the first multiplexer may be instructed to direct at least one channel of data to the dGPU for parallel lanes of data such as for processing sensor or camera data of a head mounted display headset along with graphics data for display. In an example embodiment, the first multiplexer may be 242 as shown in FIGS. 2 and 3. Multiplexer circuit 242 may be instructed to direct USB data, such as USB 2.0, USB 3.0 or other USB formatted data, along USB 240 to dGPU 114. In such a scenario for alternate mode, the option to direct some USB bandwidth of data along USB 240 to dGPU 114 is selected since the higher power consuming dGPU 114 is required for graphics processing and coordination of HMD camera 268 and other sensor data with a head mounted display headset 118 in some embodiments. In certain aspects, a device or system attached at USB-C port 212 other than a head mounted display headset 118 may require intensive graphics processing of a dGPU and high graphics data bandwidth for connectivity. In such a scenario, the Thus, multiplexer circuit 242 may direct at least one channel of USB data to USB 246 and USB controller 126 instead.

Proceeding to 512 in some embodiments such as with FIG. 3, the system disclosed may have an optional second multiplexer. Although such a second multiplexer may add cost to the system, the benefit may be to provide an adaptable high bandwidth data path from the Thunderbolt® port to either the dGPU 114 in second mode or to the CPU/iGPU 102 in first mode depending on needs of the attached peripheral device. If the system with an optional second multiplexer operates in the second mode, the second multiplexer circuit may be instructed to direct high capacity data received from the Thunderbolt® to the higher power consuming dGPU. For example, Thunderbolt® port 216 may have some portion of its high capacity lines directed to dGPU 114, such as via DisplayPort busses 308 and 304 operatively coupled through multiplexer circuit 302 in FIG. 3. When this embodiment of the hybrid USB-C port architecture operates in second mode, the high capacity lines are dedicated to dGPU 114, multiplexer circuit 302 rather than directing high capacity to CPU/iGPU 102 via DisplayPort 1.2 bus 306. In the second mode for example, a peripheral device requiring 4K capacity data throughput and processing may be detected at USB-C port 212. For example, a head mounted display headset may be detected as connected to USB-C port 212 in an example embodiment. In such a situation, multiplexer circuit 302 may direct capacity from the Thunderbolt® port 216 the dGPU to provide for greater throughput for the higher graphics processing capability of the dGPU option despite higher power consumption.

In each of these scenarios, the USB-C port 212 may operate according to a second or alternate mode at block 510 in order to allow for receipt and/or transmission of graphics information via one or more DisplayPort data lines at the toggle-capable pin connectors of the USB-C port 212 and to provide for operative coupling via DisplayPort data lines to utilize the dGPU 114 within the hybrid USB-C port architecture. Again, it is understood that the present example embodiment describes utilization of the dGPU 114 and high capacity DisplayPort data lines as a second mode however one of skill will understand that this second or alternate mode could be designated the default mode and the lower capacity mode described above could be designated as the alternate mode in other embodiments. In yet other embodiments as described above, no default or alternate mode may be designated and the hybrid USB-C port architecture may select between a first or second mode simply based on the type of peripheral device detected as connected to the USB-C port 212. In such embodiments, a table of device types or data included with the peripheral device identification metadata may indicated which mode is better suited for the attached peripheral device. At this point the method may end, however the hybrid USB-C head mounted display interface management system may continue monitoring to detect the type of peripheral device attached to the USB-C port. In some embodiments, not shown, detection of a disconnection of a peripheral device from the USB-C port may place the hybrid USB-C port architecture into default mode for restart at 502 upon detection of a newly connected peripheral device at USB-C port 212.

In an embodiment in which the USB-C controller 126 determines the multiplexing circuit 242 is operably connecting the USB-C port 212 to the dGPU 114, the USB-C controller 126 may instruct the toggle-capable connector pins of the USB-C port 212 at block 502 to switch from the alternate mode to which they were set at block 506 back to the default mode. By switching back to the default mode in such an embodiment, the USB-C controller 126 allows for the transmission of data via one or more USB 3.0 or 3.1 buses (e.g. 244 and 238). In such a way, the USB-C port 212 may operate as a USB port when the dGPU, CPU/iGPU, and/or HMD headset 118 attempt to communicate via USB 3.0 or 3.1 buses, and may operate as a DisplayPort port when the dGPU attempts to transmit high-quality graphics information to the HMD headset 118 via one or more DisplayPort buses (e.g. 222 and 236). Further, the USB-C controller 126 executing code instructions of the hybrid USB-C head mounted display interface management system in such embodiments may allow for connection of the HMD headset 118 to a USB-C port 212 via a single wire with limited modifications to the existing architecture of the information handling system (e.g. without adding a second USB-C port).

The blocks of the flow diagrams of FIGS. 4-5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system with a hybrid Universal Serial Bus Type-C (USB-C) port architecture comprising:
    a USB-C port for communicating display graphics signals to a plurality of peripheral device types attachable to the USB-C port;
    the USB-C port operably connected to a high throughput data translation hub via a first data bus capable of transmitting the display graphics signal at least at 8.1 Gbit/s across at least four lanes;
    the high throughput data translation hub operably connected to a dedicated discrete graphics processing unit (dGPU) and operably connected to a CPU with integrated GPU (iGPU) operating with lower graphics processing capacity and power than the dGPU;
    a USB-C controller executing code instructions of the hybrid USB-C head mounted display interface management system to instruct the USB-C port to operate in a first mode or in a second mode depending on identification of a peripheral device type attached to the USB-C port;
    the USB-C port operably connected to a first multiplexing circuit via a second data bus for transmitting USB data wherein the first multiplexing circuit is capable of operating in the first mode to operably connect USB data from the USB-C port to the USB-C controller; and
    the first multiplexing circuit capable of operating in the second mode to operably connect the dGPU to the USB-C port via a USB data line parallel to the first data bus.

2. The information handling system of claim 1 further comprising:
    the high throughput data translation hub operably connected to the dGPU via a third data bus capable of transmitting a display graphics signal at least at 8.1 Gbit/s across at least four lanes in the second mode.

3. The information handling system of claim 1, wherein the first multiplexer operates in the second mode when a head mounted display headset is detected at the USB-C port to provide the USB data line parallel to a high capacity data line between the dGPU and the head mounted display headset to support digital display data transmission and camera data via the USB-C port.

4. The information handling system of claim 1, wherein first mode is a default mode and the second mode is an alternate mode invoked when a peripheral device is detected at the USB-C port requiring graphics processing of the dGPU.

5. The information handling system of claim 1 further comprising:
    a second multiplexing circuit operably connecting the high throughput data translation hub to the dGPU and the iGPU;
    the multiplexing circuit operably connected to the iGPU via a third data bus capable of transmitting display graphics signals across at least two lanes; and
    the multiplexing circuit operably connected to the dGPU via a fourth data bus capable of transmitting the display graphics signal at least at 8.1 Gbit/s across at least four lanes.

6. The information handling system of claim 5, wherein the high throughput data translation hub is a Thunderbolt® port.

7. The information handling system of claim 5 further comprising:
    the USB-C controller operably connected to the second multiplexing circuit transmitting a multiplexer state instruction to the second multiplexing circuit from the hybrid USB-C head mounted display interface management system to select the first mode or the second mode of operation.

8. The information handling system of claim 1, wherein the second multiplexer operates in the second mode when a head mounted display headset is detected at the USB-C port to provide a high capacity DisplayPort data line between the dGPU and the head mounted display headset.

9. The apparatus of claim 8, wherein the first DisplayPort data bus and the second DisplayPort data bus are capable of transmitting the display graphics signal at a rate of 8.1 Gbit/s.

10. The apparatus of claim 8, wherein the first USB data bus adheres to the USB 2.0 standard.

11. The apparatus of claim 8, wherein the first mode is an alternate mode invoked when 4K resolution peripheral devices are attached to the USB-C port and the second mode is a default mode invoked when peripheral devices are detected at the USB-C port requiring graphics processing less than 4K resolution.

12. A method of adapting an information handling system with a hybrid Universal Serial Bus Type-C (USB-C) port architecture comprising:
    detecting a head mounted display headset attached to a USB-C port;
    determining via a processor executing instructions of a hybrid USB-C head mounted display interface management system, to activate a first mode for the hybrid USB-C port architecture;
    operatively coupling a dedicated discrete graphics processing unit (dGPU) and a high throughput data translation hub via a first DisplayPort data bus having at least four lanes and routing the display graphics data from the high throughput data translation hub to a USB-C port via a second DisplayPort data bus from transmission of display graphics data from dGPU to the USB-C port;
    transmitting a multiplexer state instruction to a first multiplexing circuit from the hybrid USB-C head mounted display interface management system to select the first mode to include transferring USB data via a first USB data bus to a dedicated discrete graphics processing unit (dGPU) in parallel to the first DisplayPort data bus and the second DisplayPort data bus between the dGPU and the USB-C port; and communicating with a camera or sensor of the head mounted display headset via the first USB data bus and the first multiplexer circuit.

13. The method of claim 12 further comprising:

transmitting a USB hub mode code instruction from the hybrid USB-C head mounted display interface management system based on receipt of an indication that a peripheral device is attached to the USB-C port that does not require the graphics processing of the dGPU instead of the head mounted display headset.

14. The method of claim 13 further comprising:

transmitting to a first multiplexer state instruction from the USB-C controller to the first multiplexing circuit to select a second mode to include transferring USB data via a second USB data bus to the USB-C controller for utilization by an integrated GPU (iGPU) having lower graphics processing capacity and power consumption.

15. The method of claim 12 further comprising:

transmitting a second multiplexer state instruction from the USB-C controller to a second multiplexer operably connected between the dGPU to the high throughput data translation hub and between an iGPU and the high throughput data translation hub to select operatively coupling to the dGPU in the first mode and to select operatively coupling to the iGPU in the second mode.

16. An information handling system operating a hybrid Universal Serial Bus Type-C (USB-C) head mounted display interface management system comprising:

a high throughput data translation hub;

a dedicated discrete graphics processing unit (dGPU) operably connected to the high throughput data translation hub via a first data bus capable of transmitting a display graphics signal of at least 8.1 Gbit/s across at least four lanes;

a USB-C port for communicating display graphics signals with a peripheral head mounted display headset, the USB-C port operably connected to the high throughput data translation hub via a second data bus capable of transmitting the display graphics signal of at least 8.1 Gbit/s across at least four lanes; and a USB-C controller executing code instructions of the hybrid USB-C head mounted display interface management system to instruct the USB-C port to operate in an alternate mode to receive the display graphics signal at an alternate mode-designated pin connector according to instructions received from the USB-C controller in response to detection that the peripheral head mounted display headset is attached to the USB-C port.

17. The information handling system of claim 16 further comprising:

a first multiplexing circuit capable of operating in the alternate mode and operably connecting the dGPU to the USB-C port via a USB data line parallel to the first and second data bus for communication with a camera on the peripheral head mounted display headset.

18. The information handling system of claim 16 further comprising:

an integrated graphics processing unit (iGPU) having lower graphics processing capability and consuming less power than the dGPU and operably connected to the high throughput data translation hub via a third data bus capable of transmitting a display graphics signal at 5.7 Gbit/s;

a USB-C port for communicating display graphics signals with a peripheral device other than the peripheral head mounted display headset, the USB-C port operably connected to the high throughput data translation hub via the second data bus; and a USB-C controller executing code instructions of the hybrid USB-C head mounted display interface management system to instruct the USB-C port to operate in a default mode to receive the display graphics signal at a default mode-designated pin connector according to instructions received from the USB-C controller in response to detection that the peripheral device other than the peripheral head mounted display headset is attached to the USB-C port.

19. The information handling system of claim 18 further comprising:

a first multiplexing circuit capable of operating in the default mode mode and operably connecting the USB-C controller to the USB-C port via a USB data line for USB data communication with the peripheral device other than the peripheral head mounted display headset.

20. The information handling system of claim 16 further comprising:

a second multiplexing circuit operably connecting the dGPU to the high throughput data translation hub and operably connecting an iGPU to the high throughput data translation hub via a plurality of data buses;

the multiplexing circuit capable of operating in the alternate mode to operably connect the dGPU to the high throughput data translation hub or in a default mode to operably connect the iGPU to the high throughput data translation hub according to a received multiplexer state instruction from the hybrid USB-C head mounted display interface management system.

* * * * *